United States Patent
Yin et al.

(10) Patent No.: US 12,225,339 B2
(45) Date of Patent: Feb. 11, 2025

(54) AUDIO PROCESSING METHOD, APPARATUS, AND SYSTEM

(71) Applicant: Huawei Technologies Co., Ltd., Shenzhen (CN)

(72) Inventors: Mingjie Yin, Shanghai (CN); Haibo Miao, Shanghai (CN); Qing Chang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 229 days.

(21) Appl. No.: 17/912,295

(22) PCT Filed: Mar. 3, 2021

(86) PCT No.: PCT/CN2021/078884
§ 371 (c)(1),
(2) Date: Sep. 16, 2022

(87) PCT Pub. No.: WO2021/185077
PCT Pub. Date: Sep. 23, 2021

(65) Prior Publication Data
US 2023/0147435 A1   May 11, 2023

(30) Foreign Application Priority Data
Mar. 17, 2020 (CN) .......................... 202010187760.3

(51) Int. Cl.
*H04R 1/10* (2006.01)
*H04R 5/04* (2006.01)
*H04W 4/80* (2018.01)

(52) U.S. Cl.
CPC ............. *H04R 1/1025* (2013.01); *H04R 5/04* (2013.01); *H04W 4/80* (2018.02)

(58) Field of Classification Search
CPC ........ H04R 5/033; H04R 1/1025; H04R 5/04; H04R 2420/07; H04R 1/1041; H04W 4/80
See application file for complete search history.

(56) References Cited

U.S. PATENT DOCUMENTS 10,455,066 B2 * 10/2019 Kim ..................... H04R 1/1041
2013/0316649 A1   11/2013 Newham
2015/0058910 A1    2/2015 Seveur
(Continued)

FOREIGN PATENT DOCUMENTS

CN    202004941 U   10/2011
CN    205912222 U    1/2017
(Continued)

*Primary Examiner* — Kile O Blair
(74) *Attorney, Agent, or Firm* — Conley Rose, P.C.

(57) ABSTRACT

An audio processing method includes establishing a wireless connection between a wireless headset and an electronic device, and establishing a wireless connection between the wireless headset and a charging case. The charging case collects a sound signal, generates first audio data, and sends the first audio data to the wireless headset. The wireless headset performs audio effect processing on the first audio data to obtain second audio data. The electronic device sends third audio data to the wireless headset. The wireless headset performs audio mixing processing on the second audio data and the third audio data to obtain fourth audio data and plays the fourth audio data.

20 Claims, 21 Drawing Sheets

(56) References Cited

U.S. PATENT DOCUMENTS

| | | | |
|---|---|---|---|
| 2019/0348852 A1 | 11/2019 | Cheng et al. | |
| 2020/0045159 A1 | 2/2020 | Wang | |
| 2020/0184057 A1* | 6/2020 | Mukund | ................ G06F 21/44 |

FOREIGN PATENT DOCUMENTS

| | | | |
|---|---|---|---|
| CN | 108174457 A | 6/2018 |
| CN | 109121033 A | 1/2019 |
| CN | 208971752 U | 6/2019 |
| CN | 209375876 U | 9/2019 |
| CN | 209460924 U | 10/2019 |
| CN | 209748761 U | 12/2019 |
| CN | 110856066 A | 2/2020 |

* cited by examiner

AUDIO PROCESSING METHOD, APPARATUS, AND SYSTEM

CROSS-REFERENCE TO RELATED APPLICATIONS

This is a U.S. National Stage of International Patent Application No. PCT/CN2021/078884 filed on Mar. 3, 2021, which claims priority to Chinese Patent Application No. 202010187760.3 filed on Mar. 17, 2020. Both of the aforementioned applications are hereby incorporated by reference in their entireties.

TECHNICAL FIELD

Embodiments of this application relate to the field of electronic technologies, and in particular, to an audio processing method, apparatus, and system.

BACKGROUND

To get rid of constraints and inconvenience in use of connection cables of wired headsets, true wireless stereo (true wireless stereo, TWS) headsets are increasingly favored by users.

In a scenario in which listenback is required, for example, karaoke or live broadcast, when a user uses the TWS headset, because a microphone of the TWS headset worn on ears is far away from the mouth of the user, details of a voice of the user picked up by the microphone of the TWS headset are easily lost, and a signal-to-noise ratio of the picked-up voice of the user is low. Consequently, a listenback effect of the TWS headset is poor, and user experience is poor.

SUMMARY

Embodiments of this application provide an audio processing method, apparatus, and system, so that a voice of a user can be picked up by using a charging case, and the voice of the user picked up by the charging case can be returned to the user for listenback by using a wireless headset, for example a TWS headset. The charging case may be close to the mouth of the user, so that a sound pickup effect is good, and a listenback effect for the user is also good.

To achieve the foregoing objectives, the following technical solutions are used in embodiments of this application.

According to one aspect, embodiments of this application provide an audio processing method, applied to an audio processing system. The audio processing system includes an electronic device, a wireless headset, and a charging case. The method includes: establishing a wireless connection between the wireless headset and the electronic device, and establishing a wireless connection between the wireless headset and the charging case. The charging case collects a sound signal, and generates first audio data. Then, the charging case sends the first audio data to the wireless headset. The wireless headset performs audio effect processing on the received first audio data to obtain second audio data. The electronic device sends third audio data to the wireless headset. The wireless headset performs audio mixing processing on the second audio data and the third audio data to obtain fourth audio data. The wireless headset plays the fourth audio data.

The charging case may be a charging case configured to accommodate a TWS headset. The wireless headset may be a TWS headset, a neckband wireless headset, or another wireless headset. In this way, a microphone configured to pick up the sound signal of a user is a microphone of the charging case, and an earpiece configured for listenback of the sound signal of the user is an earpiece of the wireless headset. That is, the microphone configured to pick up the sound signal of the user may be separated from the earpiece for listenback of the sound signal of the user. The user may hold the charging case and place the charging case close to the mouth of the user. The charging case may pick up details of a voice of the user, a signal-to-noise ratio of the picked-up voice of the user is high, and sound pickup quality and a sound pickup effect of the charging case are good. In addition, the earpiece of the wireless headset is also very close to an ear of the user, and an audio playing effect is good. Therefore, a listenback effect is good. In addition, this solution can break a limitation that the earpiece of the wireless headset and a sound pickup device are close to each other, and can further get rid of a trouble of a connection cable of wired transmission or a non-wireless headset.

In a possible design, the wireless headset includes a first earbud and a second earbud. That the charging case sends the first audio data to the wireless headset includes: The charging case sends the first audio data to the first earbud and the second earbud. The second audio data includes fifth audio data and sixth audio data. That the wireless headset performs audio effect processing on the first audio data to obtain second audio data includes: The first earbud performs audio effect processing on the first audio data to obtain the fifth audio data; and the second earbud performs audio effect processing on the first audio data to obtain the sixth audio data. That the electronic device sends third audio data to the wireless headset includes: The electronic device sends the third audio data to the first earbud and the second earbud. The fourth audio data includes seventh audio data and eighth audio data. That the wireless headset performs audio mixing processing on the second audio data and the third audio data to obtain fourth audio data includes: The first earbud performs audio mixing processing on the fifth audio data and the third audio data to obtain the seventh audio data; and the second earbud performs audio mixing processing on the sixth audio data and the third audio data to obtain the eighth audio data.

In this solution, the wireless headset establishes a dual-feed connection with the electronic device and the charging case. To be specific, the two earbuds of the wireless headset separately establish the wireless connection to the charging case and the electronic device, and may separately exchange data with the charging case and the electronic device.

In another possible design, the wireless headset includes a first earbud and a second earbud. That the charging case sends the first audio data to the wireless headset includes: The charging case sends the first audio data to the first earbud. That the wireless headset performs audio effect processing on the first audio data to obtain second audio data includes: The first earbud performs audio effect processing on the first audio data to obtain the second audio data. That the electronic device sends third audio data to the wireless headset includes: The electronic device sends the third audio data to the first earbud. That the wireless headset performs audio mixing processing on the second audio data and the third audio data to obtain fourth audio data includes: The first earbud performs audio mixing processing on the second audio data and the third audio data to obtain the fourth audio data. The method further includes: The first earbud sends the fourth audio data to the second earbud.

In this solution, the wireless headset establishes a forwarding connection with each of the electronic device and the charging case. To be specific, one earbud of the wireless headset establishes the wireless connection to each of the charging case and the electronic device, can exchange data with the electronic device of the charging case, and forward the exchanged data to the other earbud of the TWS headset.

In another possible design, the method further includes: The electronic device displays an application interface of a target application after detecting a first preset operation of a user, where the first preset operation is used to start the target application.

In this way, when using the target application, the user may perform sound pickup by using the charging case, and perform listenback by using the TWS headset.

In another possible design, after the charging case sends the first audio data to the wireless headset, the method further includes: The wireless headset sends the first audio data to the electronic device; and the electronic device performs service processing on the first audio data through the target application.

In this solution, the wireless headset may further send the first audio data to the electronic device, so that the target application of the electronic device performs related service processing based on the first audio data.

In another possible design, the method further includes: establishing a wireless connection between the charging case and the electronic device. After the charging case collects the sound signal, and generates the first audio data, the method further includes: The charging case sends the first audio data to the electronic device; and the electronic device performs service processing on the first audio data through the target application.

In this solution, the wireless headset may further send the first audio data to the electronic device, so that the target application of the electronic device performs related service processing based on the first audio data.

In another possible design, after the electronic device displays the application interface of the target application, the method further includes: The electronic device prompts the user whether to enter a target mode; and the electronic device enters the target mode after detecting an operation performed by the user to indicate to enter the target mode.

In this solution, after the target application is opened, the electronic device may automatically prompt the user whether to enter the target mode. The electronic device may enter the target mode according to an instruction of the user, so that sound pickup may be performed by using the charging case. In addition, wireless connections may be established between the electronic device, the wireless headset, and the charging case to exchange audio data.

In another possible design, the target application is a preset application.

The preset application may perform sound pickup by using the charging case. After the electronic device opens preset music, wireless connections may be established between the electronic device, the wireless headset, and the charging case to exchange audio data.

In another possible design, the method further includes: The electronic device displays a setting interface after detecting a second preset operation of the user, where the setting interface includes a target mode control. The electronic device enters a target mode after detecting an operation performed by the user on the target mode control.

In this solution, the electronic device may enter the target mode based on an indication operation of the user, so that sound pickup may be performed by using the charging case, and listenback may be performed by using the wireless headset.

In another possible design, the wireless headset stores a first communication address of the charging case, and the charging case stores a second communication address of the wireless headset. The establishing a wireless connection between the wireless headset and the charging case includes: After the wireless headset or the charging case detects a third preset operation of the user, the wireless headset and the charging case establishes the wireless connection based on the first communication address and the second communication address. Alternatively, after the wireless headset or the charging case receives connection information from the electronic device, the wireless headset and the charging case establish the wireless connection based on the first communication address and the second communication address.

In this solution, the wireless headset and the charging case may be devices that are used together at delivery. The wireless headset and the charging case may establish the wireless connection based on an indication operation of the user and the communication address of each other that is stored in each other.

In another possible design, the establishing a wireless connection between the wireless headset and the electronic device, and establishing a wireless connection between the wireless headset and the charging case includes: The electronic device establishes the wireless connection to the wireless headset; and the electronic device establishes the wireless connection to the charging case. Then, the electronic device sends the first communication address of the wireless headset to the charging case, and the electronic device sends the second communication address of the charging case to the wireless headset. The charging case and the wireless headset establish the wireless connection based on the first communication address and the second communication address.

In this solution, the electronic device may first establish the wireless connection to each of the wireless headset and the charging case, and then exchange the communication addresses of the wireless headset and the charging case, so that the wireless headset and the charging case establish the wireless connection based on the communication address of each other.

In another possible design, the wireless connection is a Bluetooth connection, and the charging case encodes audio data by using a Bluetooth audio codec.

The Bluetooth audio codec may compress audio data obtained at a high sampling rate to a low amount of data, to quickly transmit the audio data through Bluetooth, so that sound pickup data of the charging case can reach the wireless headset or the electronic device in real time and quickly. This implements high-bandwidth Bluetooth audio pickup and audio transmission, and implements real-time listenback of user sound.

According to another aspect, embodiments of this application provide a charging case, including a wireless communication module, a microphone, and an audio module. The wireless communication module is configured to establish a wireless connection to a wireless headset. The microphone is configured to collect a sound signal. The audio module is configured to generate first audio data based on the sound signal. The wireless communication module is further configured to send the first audio data to the wireless headset.

In this solution, the charging case may pick up a voice of a user, convert the sound into the first audio data, and send the first audio data to the wireless headset, so that the wireless headset performs related processing, plays the voice of the user, or the like based on the first audio data, to implement listenback of the sound. In this way, the microphone configured to pick up the sound signal of the user is a microphone of the charging case, and an earpiece configured for listenback of the sound signal of the user is an earpiece of the wireless headset. That is, the microphone configured to pick up the sound signal of the user may be separated from the earpiece for listenback of the sound signal of the user. The user may hold the charging case and place the charging case close to the mouth of the user. The charging case may pick up details of a voice of the user, a signal-to-noise ratio of the picked-up voice of the user is high, and sound pickup quality and a sound pickup effect of the charging case are good. In addition, the earpiece of the wireless headset is also very close to an ear of the user, and an audio playing effect is good. Therefore, a listenback effect is good.

In a possible design, that the wireless communication module is further configured to send the first audio data to the wireless headset includes: sending the first audio data to a first earbud and a second earbud of the wireless headset; or sending the first audio data to a first earbud of the wireless headset.

To be specific, in a dual-feed connection solution, a wireless connection is established between the charging case and each of the two earbuds of the wireless headset, and the first audio data may be sent to each of the two earbuds of the wireless headset. In a forwarding solution, the charging case establishes a wireless connection to only one earbud of the wireless headset, and may send the first audio data to the earbud.

In another possible design, the wireless communication module is further configured to: establish a wireless connection to an electronic device; and send the first audio data generated by the audio module to the electronic device.

In this solution, the charging case may send the first audio data to the electronic device, so that the electronic device performs related service processing on the first audio data.

In another possible design, that the wireless communication module is configured to establish a wireless connection to a wireless headset specifically includes: receiving a communication address of the wireless headset from the electronic device; and establishing the wireless connection to the wireless headset based on the communication address.

In this solution, the charging case may establish the wireless connection to the wireless headset based on the communication address of the wireless headset sent by the electronic device.

In another possible design, the charging case further includes a storage module. The storage module stores the communication address of the wireless headset. That the wireless communication module is configured to establish a wireless connection to a wireless headset specifically includes: after the charging case detects a preset operation of the user or receives connection information from the electronic device, establishing the wireless connection to the wireless headset based on the communication address.

In this solution, the charging case may establish the wireless connection to the wireless headset based on an indication operation of the user and with reference to the communication address of the wireless headset.

In another possible design, the wireless connection is a Bluetooth connection, and the audio module further includes a Bluetooth audio codec module. The Bluetooth audio codec module is configured to encode audio data.

In this solution, the Bluetooth audio codec module may compress audio data obtained at a high sampling rate to a low amount of data, to quickly transmit the audio data through Bluetooth, so that sound pickup data of the charging case can reach the wireless headset in real time and quickly. This implements high-bandwidth Bluetooth audio pickup and audio transmission, and implements real-time listenback of user sound.

According to still another aspect, embodiments of this application provide an audio processing method, applied to an audio processing system. The audio processing system includes a wireless headset and a charging case. The method includes: establishing a wireless connection between wireless headset and the charging case. The charging case collects a sound signal, and generates first audio data. The charging case sends the first audio data to the wireless headset. The wireless headset performs audio effect processing on the first audio data to obtain second audio data. The wireless headset plays the second audio data.

In this solution, a dual-feed connection is established between the wireless headset and the charging case, and both earbuds of the wireless headset exchange data with the charging case. A microphone configured to pick up the sound signal of a user is a microphone of the charging case, and an earpiece configured to listen back to the sound signal of the user is an earpiece of the wireless headset. That is, the microphone configured to pick up the sound signal of the user may be separated from the earpiece that listens back to the sound signal of the user. The user may hold the charging case and place the charging case close to the mouth of the user. The charging case may pick up details of a voice of the user, a signal-to-noise ratio of the picked-up voice of the user is high, and sound pickup quality and a sound pickup effect of the charging case are good. In addition, the earpiece of the wireless headset is also very close to an ear of the user, and an audio playing effect is good. Therefore, a listenback effect is good.

According to yet another aspect, embodiments of this application provide an audio processing method, applied to an audio processing system. The audio processing system includes a wireless headset and a charging case. The wireless headset includes a first earbud and a second earbud. The method includes: establishing a wireless connection between the wireless headset and the charging case; the charging case collects a sound signal, and generates first audio data; the charging case sends the first audio data to the first earbud; the first earbud performs audio effect processing on the first audio data to obtain second audio data; the first earbud sends the second audio data to the second earbud; and the first earbud and the second earbud play the second audio data.

In this solution, the wireless headset establishes a forwarding connection to the charging case, and the charging case exchanges data with one earbud of the wireless headset. A microphone configured to pick up the sound signal of a user is a microphone of the charging case, and an earpiece configured for listenback of the sound signal of the user is an earpiece of the wireless headset. That is, the microphone configured to pick up the sound signal of the user may be separated from the earpiece for listenback of the sound signal of the user. The user may hold the charging case and place the charging case close to the mouth of the user. The charging case may pick up details of a voice of the user, a signal-to-noise ratio of the picked-up voice of the user is high, and sound pickup quality and a sound pickup effect of the charging case are good. In addition, the earpiece of the wireless headset is also very close to an ear of the user, and an audio playing effect is good. Therefore, a listenback effect is good.

According to still yet another aspect, embodiments of this application provide an audio processing system, including an electronic device, a wireless headset, and a charging case. The electronic device, the wireless headset, and the charging case are configured to establish a wireless connection between the wireless headset and the electronic device and establish a wireless connection between the wireless headset and the charging case. The charging case is further configured to collect a sound signal and generate first audio data. The charging case is further configured to send the first audio data to the wireless headset. The wireless headset is further configured to perform audio effect processing on the first audio data to obtain second audio data. The electronic device is further configured to send third audio data to the wireless headset. The wireless headset is further configured to perform audio mixing processing on the second audio data and the third audio data to obtain fourth audio data. The wireless headset is further configured to play the fourth audio data.

The electronic device, the wireless headset, and the charging case in the audio processing system are configured to perform the audio processing method in any possible design of any one of the foregoing aspects.

In a possible design, the wireless headset includes a first earbud and a second earbud. That the charging case is configured to send the first audio data to the wireless headset specifically includes: sending the first audio data to the first earbud and the second earbud. The second audio data includes fifth audio data and sixth audio data. That the wireless headset is configured to perform audio effect processing on the first audio data to obtain second audio data specifically includes: performing audio effect processing on the first audio data by using the first earbud, to obtain the fifth audio data, and performing audio effect processing on the first audio data by using the second earbud, to obtain the sixth audio data. That the electronic device is configured to send third audio data to the wireless headset specifically includes: sending the third audio data to the first earbud and the second earbud. The fourth audio data includes seventh audio data and eighth audio data. That the wireless headset is configured to perform audio mixing processing on the second audio data and the third audio data to obtain fourth audio data includes: performing audio mixing processing on the fifth audio data and the third audio data by using the first earbud, to obtain the seventh audio data; and performing audio mixing processing on the sixth audio data and the third audio data by using the second earbud, to obtain the eighth audio data.

In a possible design, the wireless headset includes a first earbud and a second earbud. That the charging case is configured to send the first audio data to the wireless headset includes: sending the first audio data to the first earbud. That the wireless headset is configured to perform audio effect processing on the first audio data to obtain second audio data includes: The first earbud is configured to perform audio effect processing on the first audio data to obtain the second audio data. That the electronic device is configured to send third audio data to the wireless headset includes: sending the third audio data to the first earbud. That the wireless headset is configured to perform audio mixing processing on the second audio data and the third audio data to obtain fourth audio data includes: The first earbud is configured to perform audio mixing processing on the second audio data and the third audio data to obtain the fourth audio data. The wireless headset is further configured to send the fourth audio data to the second earbud by using the first earbud.

In another possible design, the electronic device is further configured to display an application interface of a target application after detecting a first preset operation of a user. The first preset operation is used to start the target application.

In another possible design, the wireless headset is further configured to send the first audio data to the electronic device after the charging case sends the first audio data to the wireless headset. The electronic device is further configured to perform service processing on the first audio data through the target application.

In another possible design, the charging case is further configured to send the first audio data to the electronic device after collecting the sound signal and generating the first audio data. The electronic device is further configured to perform service processing on the first audio data through the target application.

In another possible design, the electronic device is further configured to: after displaying the application interface of the target application, prompt the user whether to enter a target mode; and enter the target mode after detecting an operation performed by the user to indicate to enter the target mode.

In another possible design, the target application is a preset application.

In another possible design, the electronic device is further configured to: display a setting interface after detecting a second preset operation of the user, where the setting interface includes a target mode control; and enter the target mode after detecting an operation performed by the user for the target mode control.

In another possible design, the wireless headset stores a first communication address of the charging case, and the charging case stores a second communication address of the wireless headset. That the wireless headset and the charging case are configured to establish a wireless connection between the wireless headset and the charging case includes: After the wireless headset or the charging case detects a third preset operation of the user, the wireless headset and the charging case are configured to establish the wireless connection based on the first communication address and the second communication address. Alternatively, after the wireless headset or the charging case receives connection information from the electronic device, the wireless headset and the charging case are configured to establish the wireless connection based on the first communication address and the second communication address.

In another possible design, that the electronic device, the wireless headset, and the charging case are configured to establish a wireless connection between the wireless headset and the electronic device and establish a wireless connection between the wireless headset and the charging case specifically includes: The electronic device is configured to establish the wireless connection to the wireless headset; the electronic device is further configured to establish a wireless connection to the charging case; the electronic device is configured to send the first communication address of the wireless headset to the charging case; the electronic device is further configured to send the second communication address of the charging case to the wireless charging case; and the charging case and the wireless headset are configured to establish the wireless connection based on the first communication address and the second communication address.

In another possible design, the wireless connection is a Bluetooth connection, and the charging case encodes audio data by using a Bluetooth audio codec.

According to a further aspect, embodiments of this application provide an audio processing apparatus. The apparatus is included in an audio device. The apparatus has a function of implementing behavior of the audio device in any method in the foregoing aspects and possible designs, so that the audio device performs the audio processing method in any possible design of the foregoing aspects. The function may be implemented by hardware, or may be implemented by hardware executing corresponding software. The hardware or the software includes at least one module or unit corresponding to the foregoing function. For example, the apparatus may include an audio module, a microphone, or the like. The audio device may be the foregoing electronic device, wireless headset, or charging case.

According to a still further aspect, embodiments of this application provide an audio device, including one or more processors and a memory. The memory stores code. When the code is executed by the audio device, the audio device is enabled to perform the audio processing method performed by the audio device in any possible design of the foregoing aspects. The audio device may be the foregoing electronic device, wireless headset, or charging case.

According to a yet further aspect, embodiments of this application provide a computer-readable storage medium, including computer instructions. When the computer instructions are run on an audio device, the audio device is enabled to perform the audio processing method according to any possible design of the foregoing aspects. The audio device may be the foregoing electronic device, wireless headset, or charging case.

According to a still yet further aspect, embodiments of this application provide a computer program product. When the computer program product runs on a computer, the computer is enabled to perform the audio processing method performed by the audio device in any possible design of the foregoing aspects. The audio device may be the foregoing electronic device, wireless headset, or charging case.

According to even yet another aspect, embodiments of this application provide a chip system, and the chip system is used in an audio device. The chip system includes one or more interface circuits and one or more processors. The interface circuit and the processor are interconnected through a line. The interface circuit is configured to receive a signal from a memory of the audio device, and send the signal to the processor. The signal includes computer instructions stored in the memory. When the processor executes the computer instructions, the audio device is enabled to perform the audio processing method in any possible design of the foregoing aspects. The audio device may be the foregoing electronic device, wireless headset, or charging case.

For beneficial effects corresponding to the foregoing other aspects, refer to the descriptions of the beneficial effects in the method aspects. Details are not described herein again.

DESCRIPTION OF EMBODIMENTS

Figure 1:
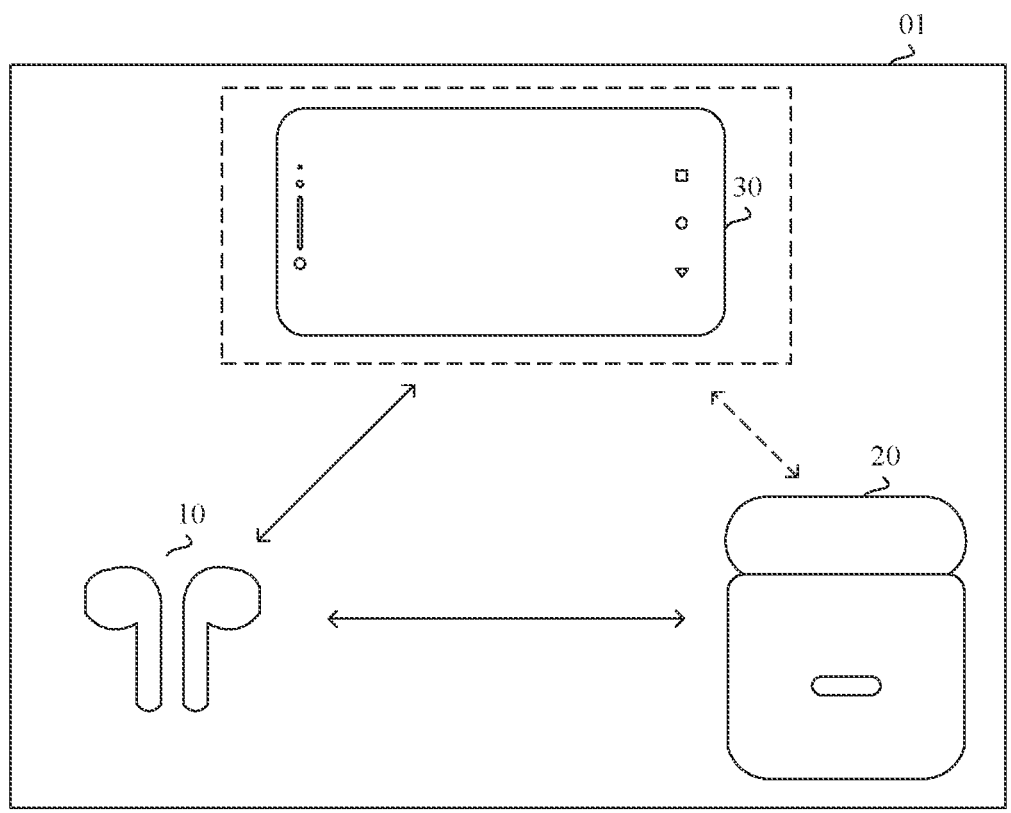
FIG. 1 is a schematic diagram of an architecture of an audio processing system according to an embodiment of this application.

The following describes the technical solutions in embodiments of this application with reference to the accompanying drawings in embodiments of this application. In description in embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in embodiments of this application, "a plurality of" means two or more.

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of embodiments, unless otherwise specified, "a plurality of" means two or more.

In the current technology, in a scenario in which listenback is required, for example, a user performs karaoke or live broadcast, a microphone of a TWS headset is far away from the mouth of the user, and sound picked up by the microphone of the TWS headset easily lacks details and has a poor signal-to-noise ratio. Consequently, a listenback effect of the TWS headset is poor, and user experience is poor.

Embodiments of this application provide an audio processing method, applied to a listenback scenario in which the user needs to hear his/her voice by using a headset, for example, karaoke, live broadcast, singing, speech, or speaking. For example, in a karaoke scenario, an environment may be noisy, or an accompaniment sound is large. A karaoke user probably cannot clearly hear his/her own voice or hear his/her own voice with a delay due to sound propagation in the air. In this case, the karaoke user may hear his/her voice and accompaniment in real time through listenback, to match his/her voice with the accompaniment, so as to ensure that his/her voice is not out of tone or out of tune, and adjust a status of his/her voice in time.

In another example, at a noisy party or activity performance site, a person who speaks may not hear his/her own voice clearly or hear his/her own voice with a delay due to sound propagation in the air. In this case, the speaker can hear his/her voice in real time through listenback, to adjust his/her voice in real time, so as to avoid abnormal voice.

In the audio processing method provided in embodiments of this application, for a listenback scenario in which the user needs to his/her voice by using a headset, a charging case used to accommodate a TWS headset may collect a sound signal of the user, generate first audio data based on the collected sound signal, and send the first audio data to the TWS headset. The TWS headset may play target audio data corresponding to the sound signal of the user, to return the voice of the user to the user for listenback. The target audio data may include the first audio data corresponding to the sound signal of the user, or the target audio data may include second audio data obtained after audio effect processing is performed on the first audio data. A process in which the charging case collects the sound signal and converts the sound signal into the first audio data may also be referred to as charging case sound pickup, charging case sound pickup, or the like, and the first audio data may also be referred to as sound pickup data.

In this way, a microphone configured to pick up the sound signal of the user is a microphone of the charging case, and an earpiece configured for listenback of the sound signal of the user is an earpiece of the TWS headset. That is, the microphone configured to pick up the sound signal of the user may be separated from the earpiece for listenback of the sound signal of the user. The user may hold the charging case and place the charging case close to the mouth of the user. The charging case may pick up details of a voice of the user, a signal-to-noise ratio of the picked-up voice of the user is high, and sound pickup quality and a sound pickup effect of the charging case are good. In addition, the earpiece of the TWS headset is also very close to an ear of the user, and an audio playing effect is good. Therefore, a listenback effect is good.

In some embodiments, the TWS headset may alternatively receive audio data (for example, accompaniment during karaoke or background music during live broadcast) sent by an electronic device, and play the audio data sent by the electronic device and the target audio data corresponding to the sound signal of the user together to the user.

In addition, audio data is transmitted between the TWS headset, the charging case, and the electronic device by using a wireless communication technology. In this way, a connection cable for wired transmission or a non-TWS headset can be removed, and user experience can be improved.

In addition, in the listenback scenario, for example, karaoke or live broadcast, when the charging case is configured to pick up sound and two earbuds are configured for listenback, the user can further obtain a better immersive feeling.

The audio processing method provided in embodiments of this application may be applied to an audio processing system. FIG. 1 is a schematic diagram of an architecture of an audio processing system 01. The audio processing system 01 includes a TWS headset 10 and a charging case 20. The charging case may be configured to accommodate the TWS headset. There is a wireless connection between the TWS headset and the charging case, and audio data may be transmitted by using a wireless communication technology. The charging case may collect a sound signal of a user, generate first audio data based on the sound signal of the user, and send the first audio data to the TWS headset. The TWS headset may play target audio data corresponding to the sound signal of the user to the user, to return a voice of the user to the user for listenback. The target audio data includes the first audio data, or includes second audio data obtained after audio effect processing is performed on the first audio data.

In some embodiments, as shown in FIG. 1, the audio processing system 01 may further include an electronic device 30. There is the wireless connection between the TWS headset and the charging case, there is a wireless connection between the TWS headset and the electronic device, and audio data may be transmitted by using the wireless communication technology. In some embodiments, there is also a wireless connection between the charging case and the electronic device, and audio data may be transmitted by using the wireless communication technology.

The charging case may collect the sound signal of the user, generate the first audio data based on the sound signal of the user, and send the first audio data to the TWS headset. The TWS headset may further receive third audio data sent by the electronic device. The TWS headset may play the target audio data and the third audio data together to the user, to implement a listenback function. The target audio data includes the first audio data, or includes the second audio data obtained after audio effect processing is performed on the first audio data. For example, the TWS headset may perform audio mixing processing on the target audio data and third audio data that is sent by the electronic device, and then play audio data obtained through audio mixing processing to the user. For example, in a karaoke scenario, the TWS headset may perform audio mixing processing on the target audio data corresponding to the sound signal of the user and accompaniment from the electronic device, and then play audio data obtained through audio mixing processing to the user.

In addition, the first audio data generated by the charging case may be alternatively sent to the electronic device, or forwarded to the electronic device through the TWS headset, so that the electronic device performs related service processing based on a target application currently used by the user.

For example, in the audio processing system provided in this embodiment of this application, the wireless communication technology used for audio data transmission may be Bluetooth (Bluetooth, BT), infrared (infrared, IR), wireless local area networks (wireless local area networks, WLAN) (such as a wireless fidelity (wireless fidelity, Wi-Fi) network, a global navigation satellite system (global navigation satellite system, GNSS), frequency modulation (frequency modulation, FM), a near field communication technology (near field communication, NFC), or the like. A specific type of the wireless communication technology is not limited in this embodiment of this application.

It should be noted that the TWS headset 10 in the audio processing system shown in FIG. 1 may alternatively be replaced with another wireless headset. The wireless headset does not have a sound pickup cable, and does not need to be connected to an audio device through a headset jack. For example, the TWS headset 10 in the audio processing system shown in FIG. 1 may be replaced with a wireless headset having a connection cable between earbuds, for example, a neckband wireless headset.

The following describes a structure of each device in the audio processing system by using an example.

Figure 2:
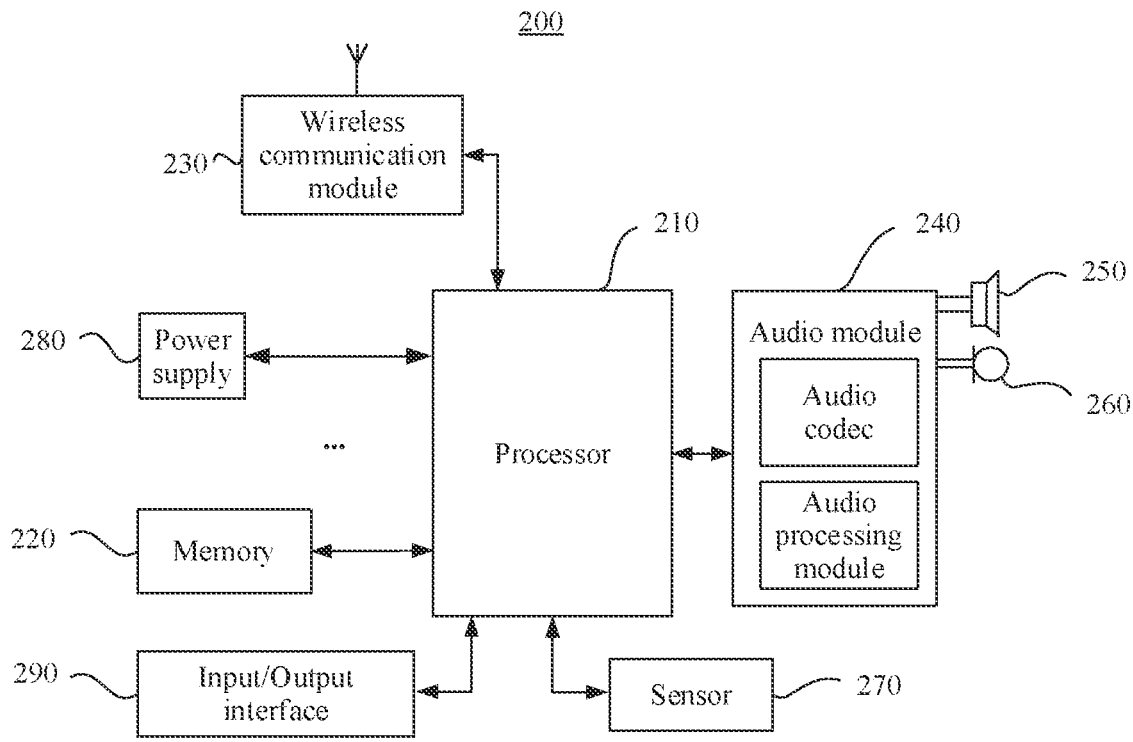
FIG. 2 is a schematic diagram of a structure of an earbud of a TWS headset according to an embodiment of this application.

A TWS headset may generally include a pair of earbuds, for example, include an earbud 1 and an earbud 2. For example, FIG. 2 is a schematic diagram of a structure of an earbud 200 included in the TWS headset. The earbud 200 may include a processor 210, a memory 220, a wireless communication module 230, an audio module 240, at least one receiver 250, at least one microphone 260, a sensor 270, a power supply 280, an input/output interface 290, and the like.

The memory 220 may be configured to store application program code, for example, program code used to establish a wireless connection to the other earbud 200 of the TWS headset and enable the earbud 200 to establish a wireless connection to the electronic device.

The processor 210 may execute the foregoing program code, to implement functions of the earbud 200 in this embodiment of this application, for example, controlling the wireless communication module 230 to receive audio data from a charging case or an electronic device, performing audio processing on the received audio data, and controlling the receiver 250 to play processed audio data. The processor 210 may be a general-purpose central processing unit (central processing unit, CPU), a microprocessor, an application-specific integrated circuit (application-specific integrated circuit, ASIC), a digital signal processor (digital signal processor, DSP), one or more integrated circuits configured to control program execution of solutions of this application, or the like.

The memory 220 may further store a Bluetooth address (which may also be referred to as a communication address) used to uniquely identify the earbud 200, and a Bluetooth address of the other earbud of the TWS headset. In addition, the memory 220 may further store a pairing history of the electronic device that has been successfully paired with the earbud 200 before. For example, the pairing history may include a Bluetooth address of the electronic device that has been successfully paired with the earbud 200. Based on the pairing history, the earbud 200 can automatically be connected to the electronic device that has been paired with the earbud 200. For another example, the memory 220 may further store a Bluetooth address of the charging case used to accommodate the earbud 200. The earbud 200 can establish a Bluetooth connection to the charging case based on the Bluetooth address. For example, the Bluetooth address may be a media access control (media access control, MAC) address.

The wireless communication module 230 is configured to support the current earbud 200 and the other earbud of the TWS headset in exchanging wireless data with various electronic devices and the charging case, and support the TWS headset in establishing a wireless connection to each of the electronic device and the charging case.

For example, in some embodiments, the wireless communication module 230 may be a Bluetooth module. The earbud 200 may establish a Bluetooth connection to each of the charging case and the electronic device by using the Bluetooth module, to implement mutual short-distance data exchange.

The audio module 240 is configured to convert digital audio data into an analog audio electrical signal for outputting, and is also configured to convert an analog audio electrical signal input into digital audio data. Audio data may be transmitted between the audio module 240 and the wireless communication module 230, to implement functions such as calling or music playing.

The audio module 240 may further include an audio codec, configured to encode and decode audio data. For example, the audio codec may be a high-definition Bluetooth codec, and may encode first audio data generated based on a sound signal collected at a high sampling rate (for example, a sampling rate greater than or equal to 16 kHz, for example, 48 kHz or 32 kHz), so that encoded first audio data can reserve sound information of a high bandwidth (for example, a bandwidth of 0 to 24 kHz or a bandwidth of 0 to 16 kHz). In this way, more real and highly clear sound information is obtained for subsequent listenback by a user. In addition, an amount of encoded data is small, and high-speed transmission may be performed by using a wireless communication technology, for example, Bluetooth.

The audio module 240 may further include an audio processing module, configured to perform audio processing on audio data. For example, the audio processing module may include an audio effect processing module, configured to perform audio effect processing on the first audio data sent by the charging case. For another example, the audio processing module may further include an audio mixing processing module, configured to perform audio mixing processing on second audio data obtained through audio effect processing and third audio data sent by the electronic device.

In some embodiments, the audio module 240 may be disposed in the processor 210, or some functional modules of the audio module 240 are disposed in the processor 210.

The at least one receiver 250, also referred to as "earpiece", may be configured to convert an analog audio electrical signal into a sound signal and play the sound signal. For example, when the earbud 200 of the TWS headset is used as an audio output device of the electronic device, the receiver 250 may convert audio electrical signals received from the charging case and the electronic device into sound signals and play the sound signals. The audio electrical signal is the audio data in this embodiment of this application.

The at least one microphone 260, also referred to as "mike" or "mic", is configured to convert a sound signal into an audio electrical signal. For example, the microphone 260 may detect a sound signal when the user sings or speaks, and convert the sound signal into an analog audio electrical signal.

The sensor 270 may include a component, for example, a distance sensor 270 or an optical proximity sensor 270. The earbud 200 may determine, by using the sensor 270, whether the earbud is worn by the user. In some other embodiments, the earbud 200 may further include a touch sensor 270, configured to detect a touch operation performed by the user.

The power supply 280 may be configured to supply power to the components included in the earbud 200 of the TWS headset. In some embodiments, the power supply 280 may be a battery, for example, a rechargeable battery.

The input/output interface 290 is configured to provide wired connection between the earbud. 200 of the TWS headset and the charging case. In some embodiments, the input/output interface 290 may be an electrical connector. When the earbud 200 of the TWS headset is placed in the charging case, the earbud 200 of the TWS headset may be electrically connected to the charging case (for example, an input/output interface 290 included in the charging case) through the electrical connector. After the electrical connection is established, the charging case may charge the power supply 280 of the earbud 200 of the TWS headset. After the electrical connection is established, the earbud 200 of the TWS headset may further perform data communication with the charging case. For example, the earbud 200 of the TWS headset may receive a pairing instruction from the charging case through the electrical connector. The pairing command is used to instruct the earbud 200 of the TWS headset to start the wireless communication module 230, so that the earbud 200 of the TWS headset can perform a pairing connection with the electronic device by using a corresponding wireless communication protocol (for example, Bluetooth).

It can be understood that the structure illustrated in this embodiment of this application does not constitute any specific limitation on the earbud 200 of the TWS headset. The Bluetooth device may have more or fewer components than those shown in FIG. 2, or combine two or more components, or have different component configurations. For example, the earbud 200 may further include components such as an indicator light (which may indicate a status such as a battery level of the earbud 200), a dust filter (which may be used with the earpiece), or a motor. Various components shown in the FIG. 2 may be implemented in hardware that includes one or more signal processing or application-specific integrated circuits, in software, or in a combination of hardware and software.

In this embodiment of this application, the wireless communication module 230 may receive, from the charging case, the first audio data corresponding to the sound signal of the user, and may further receive the third audio data sent by the electronic device. The receiver 250 may play target audio data corresponding to the sound signal of the user and the third audio data, convert an electrical signal corresponding to audio data into a sound signal that can be heard by the user. The target audio data includes the first audio data, or includes the second audio data obtained after audio effect processing is performed on the first audio data.

In some embodiments, the audio processing module may perform audio effect processing on the first audio data, and may further perform audio mixing processing on the second audio data obtained through audio effect processing and the third audio data sent by the electronic device. The receiver 250 may play audio data obtained after audio mixing processing.

In some other embodiments, audio data received by the wireless communication module 230 from the charging case and the electronic device may be audio data encoded by the audio codec. The wireless communication module 230 first decodes the received audio data, and then performs audio processing such as audio effect processing or audio mixing processing. An amount of encoded data is small, and high-speed transmission may be performed by using the wireless communication technology, for example, Bluetooth.

Figure 3:
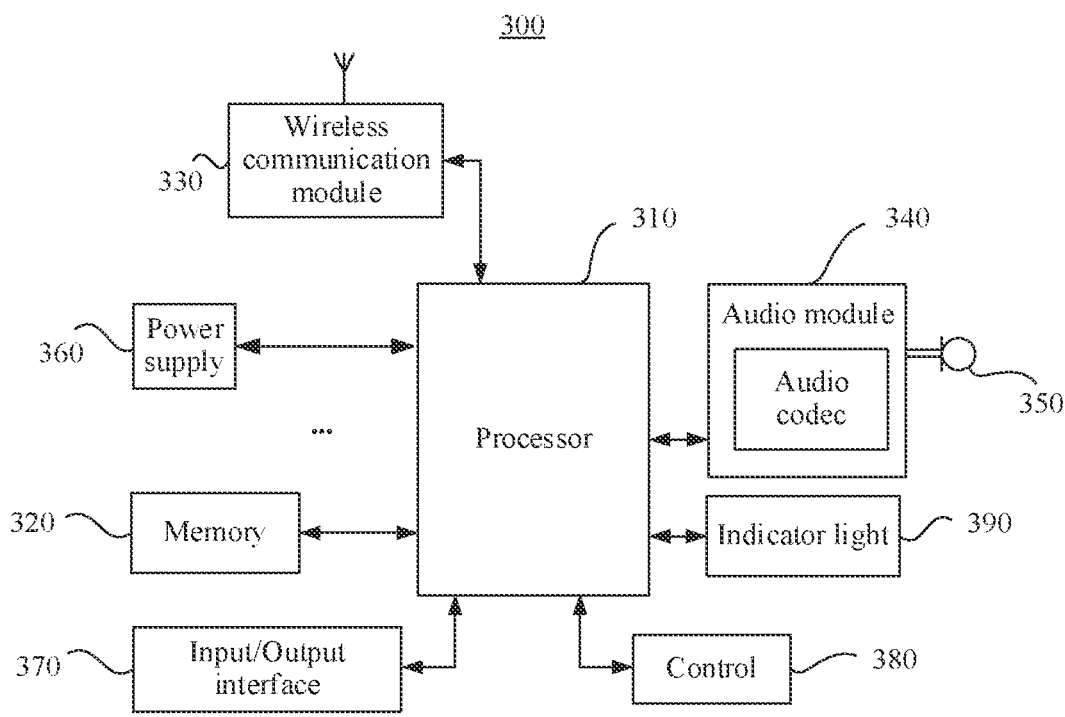
FIG. 3 is a schematic diagram of a structure of a charging case according to an embodiment of this application.

For example, FIG. 3 is a schematic diagram of a structure of a charging case 300. As shown in FIG. 3, the charging case 300 may be configured to accommodate earbuds of a TWS headset. The charging case 300 includes a processor 310, a memory 320, a wireless communication module 330, an audio module 340, at least one microphone 350, a power supply 360, an input/output interface 370, and the like.

The memory 320 may be configured to store application program code, and the processor 310 of the charging case 300 controls execution of the application program code to implement a function of the charging case 300, for example, may implement functions such as wireless connection and wireless communication between the charging case 300 and the TWS headset or an electronic device. The processor 310 may be a CPU, a microprocessor, an ASIC, DSP, one or more integrated circuits configured to control program execution in the solutions of this application, or the like.

The memory 320 may further store a Bluetooth address of an accommodated earbud. The charging case 300 can establish a Bluetooth connection to the earbud based on the Bluetooth address. For example, the Bluetooth address may be a MAC address.

The wireless communication module 330 is configured to support wireless data exchange between the charging case 300 and the TWS headset and/or the electronic device, and support the charging case 300 in establishing wireless connections to a plurality of devices.

In some embodiments, the wireless communication module 330 may be a Bluetooth module. The charging case 300 may establish a Bluetooth connection to each of the TWS headset and the electronic device by using the Bluetooth module, to implement mutual short-distance data exchange.

The audio module 340 is configured to convert an analog audio electrical signal input into digital audio data. For example, the audio module 340 may be configured to convert, into first audio data, an analog audio electrical signal that is converted from a sound signal by the microphone 350.

The audio module 340 may further include an audio codec, configured to encode and decode audio data. For example, the audio codec may be a Bluetooth high-bandwidth codec. In some embodiments, the audio module 340 may be disposed in the processor 310, or some functional modules of the audio module 340 are disposed in the processor 310.

The at least one microphone 350, also referred to as "mike" or "mic", is configured to convert a sound signal into an audio electrical signal. For example, when the charging case 300 approaches the mouth of the user, in a process in which the user makes a sound, for example, speaking, singing, or talking, the microphone 350 may collect a sound signal of the user, and convert the sound signal into an analog audio electrical signal.

In some embodiments, at least one control may be disposed on the charging case 300, and may be used for operations such as triggering the charging case 300 to establish the wireless connection to the TWS headset, or triggering re-pairing between the two earbuds of the TWS headset, or triggering the charging case 300 to establish the wireless connection to the electronic device.

In addition, the charging case 300 may further include the power supply 360, which may be configured to supply power to each component included in the charging case 300. A charging port may further be disposed on the charging case 300, and is configured to charge the charging case 300.

The charging case 300 may further include the input/output interface 370. When the earbud of the TWS headset is placed in the charging case 300, the input/output interface 370 may be configured to charge the earbud.

It can be understood that the charging case 300 may further include another control, and details are not described herein. The structure illustrated in embodiments of this application does not constitute a specific limitation on the charging case 300. The charging case 300 may have more or fewer components than those shown in FIG. 3, or combine two or more components, or have different component configurations. For example, the charging case 300 may further include a component, for example, a control 380 or an indicator light 390.

In this embodiment of this application, the microphone 350 and the audio module 340 may convert the sound signal of the user into the first audio data. The wireless communication module 330 may send the first audio data to the TWS headset, so that the TWS headset plays target audio data. The target audio data includes the first audio data, or includes second audio data obtained after audio effect processing is performed on the first audio data. The wireless communication module 330 may further send the first audio data to the electronic device, so that the electronic device performs processing such as audio recording.

In some embodiments, the first audio data sent by the wireless communication module 330 to the TWS headset and the electronic device is audio data encoded by the audio codec. An amount of encoded data is small, and high-speed transmission may be performed by using a wireless communication technology, for example, Bluetooth.

The electronic device in the audio processing system may be a device, for example, a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA). A specific type of the electronic device is not limited in embodiments of this application.

Figure 4:
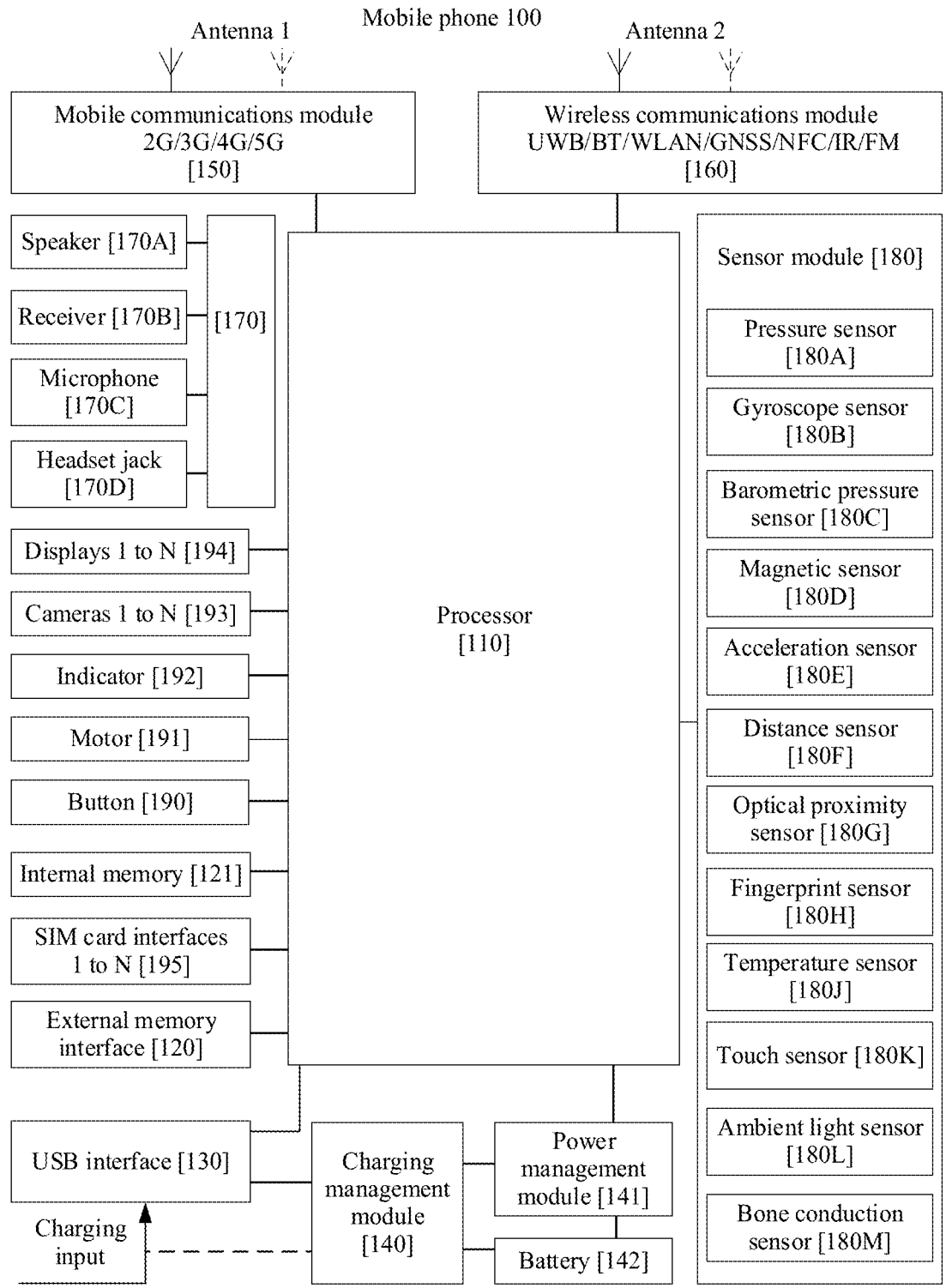
FIG. 4 is a schematic diagram of a structure of a mobile phone according to an embodiment of this application.

For example, the electronic device is a mobile phone. FIG. 4 is a schematic diagram of a structure of a mobile phone 100. As shown in FIG. 4, the mobile phone 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a DSP, a baseband processor, and/or a neural-network processing unit (neural-network processing unit, NPU). Different processing units may be independent components, or may be integrated into one or more processors.

The internal memory 121 may be configured to store computer executable program code, where the executable program code includes instructions. The processor 110 runs the instructions stored in the internal memory 121, to perform various function applications of the mobile phone 100 and data processing. The internal memory 121 may include a program storage area and a data storage area. The program storage area may store an operating system, an application required by at least one function (for example, a voice playing function or an image playing function), and the like. The data storage area may store data (such as audio data and a phone book) and the like created during use of the mobile phone 100. In addition, the internal memory 121 may include a high-speed random access memory, or may include a nonvolatile memory, for example, at least one magnetic disk storage device, a flash memory, or a universal flash storage (universal flash storage, UFS).

For example, the processor 110 runs the instructions stored in the internal memory 121, to implement a function of establishing wireless connections (for example, Bluetooth connections) between the mobile phone and a plurality of devices such as a TWS headset or a charging case, and may further perform, through a target application, processing such as audio recording on first audio data corresponding to a sound signal collected by the charging case.

A wireless communication function of the mobile phone 100 may be implemented through the antenna 1, the antenna 2, the mobile communication module 150, the wireless communication module 160, the modem processor, the baseband processor, and the like.

The wireless communication module 160 may provide a wireless communication solution that is applied to the mobile phone 100 and that includes a WLAN (for example, a Wi-Fi network), BT, a GNSS, FM, NFC, IR, and the like. The wireless communication module 160 may be one or more components integrating at least one communication processor module. The wireless communication module 160 receives an electromagnetic wave by the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In this embodiment of this application, the wireless communication module 160 may establish wireless connections (for example, Bluetooth connections) to a plurality of devices such as the TWS headset or the charging case, receive the first audio data from the TWS headset or the charging case, and may further send third audio data (for example, accompaniment) to the TWS headset.

The mobile phone 100 may implement audio functions, for example, music playing and recording, by using the audio module 170, the speaker 170A, the receiver 170B, the microphone 170C, the headset jack 170D, the application processor, and the like.

The audio module 170 is configured to convert a digital audio electrical signal into an analog audio electrical signal for outputting, and is also configured to convert an analog audio electrical signal input into digital audio data. Audio data may be transmitted between the audio module 170 and the wireless communication module 160, to implement functions such as calling, music playing, audio recording, or audio file generation. The audio module 170 may further include an audio codec, configured to encode and decode audio data.

In some embodiments, the audio module 170 may be disposed in the processor 110, or some functional modules of the audio module 170 are disposed in the processor 110.

The touch sensor 180K is also referred to as a touch panel. The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided on the display 194. In some other embodiments, the touch sensor 180K may alternatively be disposed on a surface of the mobile phone 100, and is located on a position different from that of the display 194.

It may be understood that the structure illustrated in embodiments of this application does not constitute a specific limitation on the mobile phone 100. In other embodiments of this application, the mobile phone 100 may include more or fewer components than those shown in the figure, or combine some components, or split some components, or have different component arrangements. The components shown in the figure may be implemented by hardware, software, or a combination of software and hardware.

In this embodiment of this application, the wireless communication module 160 may receive, from the charging case or the TWS headset, the first audio data corresponding to the sound signal of a user, and may further send the third audio data to the TWS headset. The processor 110 may perform, through the target application, processing such as audio recording on the first audio data corresponding to the sound signal collected by the charging case. An application interface of the target application may be displayed on the display 194.

In some embodiments, the first audio data received by the wireless communication module 160 from the charging case or the TWS headset is audio data encoded by the audio codec, and the audio codec may decode the encoded audio data received by the wireless communication module. In addition, the third audio data sent by the wireless communication module 160 to the TWS headset is also audio data encoded by the audio encoder. An amount of the encoded data is small, and high-speed transmission may be performed by using a wireless communication technology, for example, Bluetooth.

The following describes the audio processing method provided in embodiments of this application by using examples in which the audio processing system includes a TWS headset, a charging case, and an electronic device, the TWS headset has the structure shown in FIG. 2, the charging case has the structure shown in FIG. 3, the electronic device is a mobile phone with the structure shown in FIG. 4, and a wireless communication technology used to transmit audio data is Bluetooth.

In embodiments of this application, when a user performs listenback by using the charging case and the TWS headset. Bluetooth connections may be first established between the TWS headset, the charging case, and the mobile phone. An architecture of the Bluetooth connections between the TWS headset, the charging case, and the mobile phone includes the following two cases.

Figure 5A:
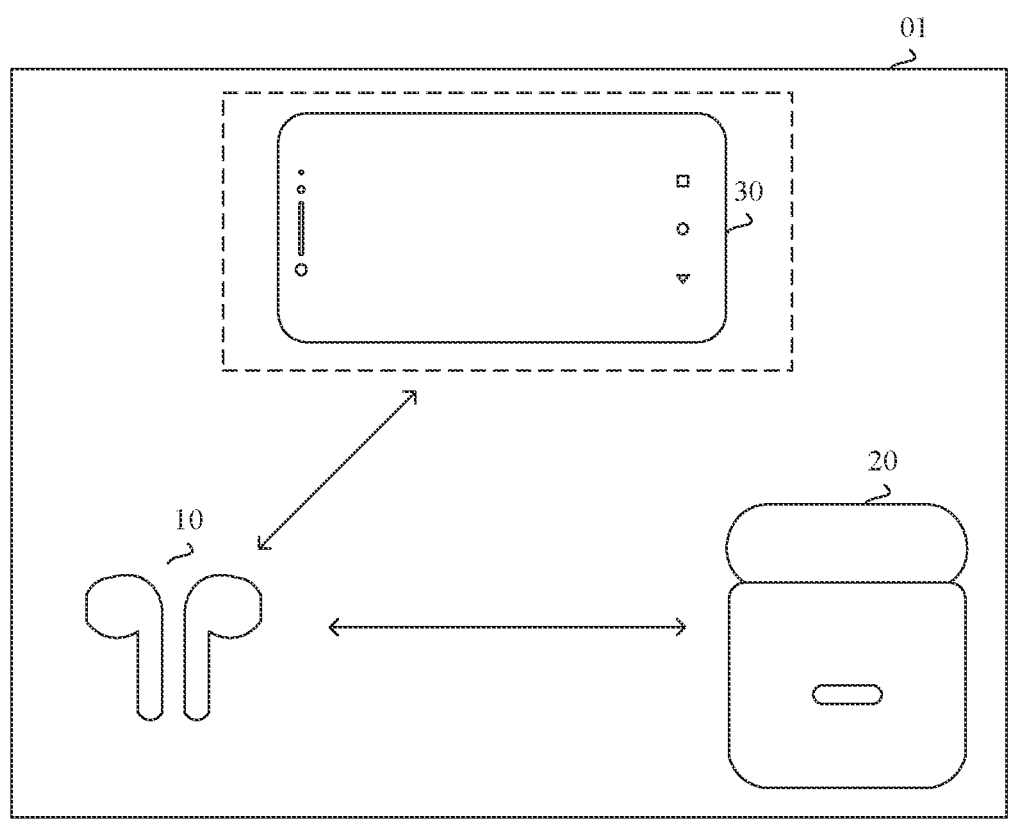
FIG. 5A is a schematic diagram of a connection architecture of a TWS headset, a charging case, and a mobile phone according to an embodiment of this application.

Case 1: Refer to FIG. 5A. A Bluetooth connection is established between the TWS headset and the charging case, a Bluetooth connection is established between the TWS headset and the mobile phone, and no Bluetooth connection is established between the mobile phone and the charging case.

Figure 5B:
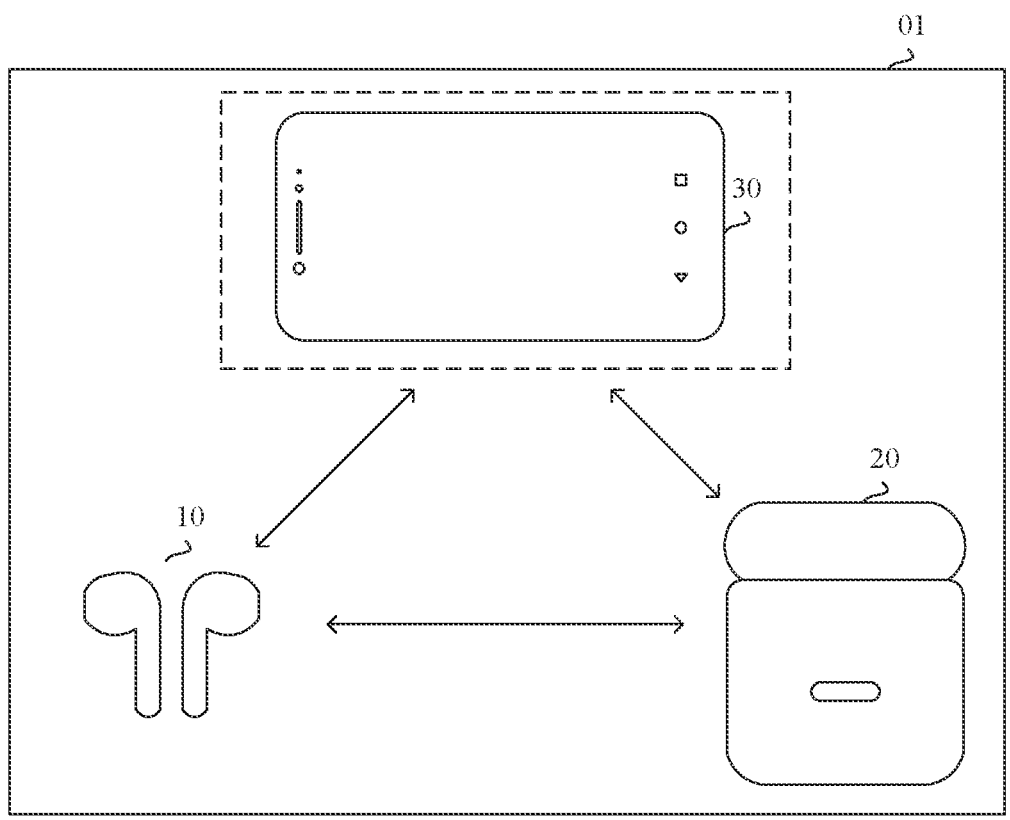
FIG. 5B is a schematic diagram of another connection architecture of a TWS headset, a charging case, and a mobile phone according to an embodiment of this application.

Case 2: Refer to FIG. 5B. A Bluetooth connection is established between the TWS headset and the charging case, a Bluetooth connection is established between the TWS headset and the mobile phone, and a Bluetooth connection is established between the mobile phone and the charging case.

The Bluetooth connections may be established between the TWS headset and the mobile phone and between the TWS headset and the charging case by using an existing forwarding connection solution, a dual-feed connection solution, or another solution.

Figure 6A:
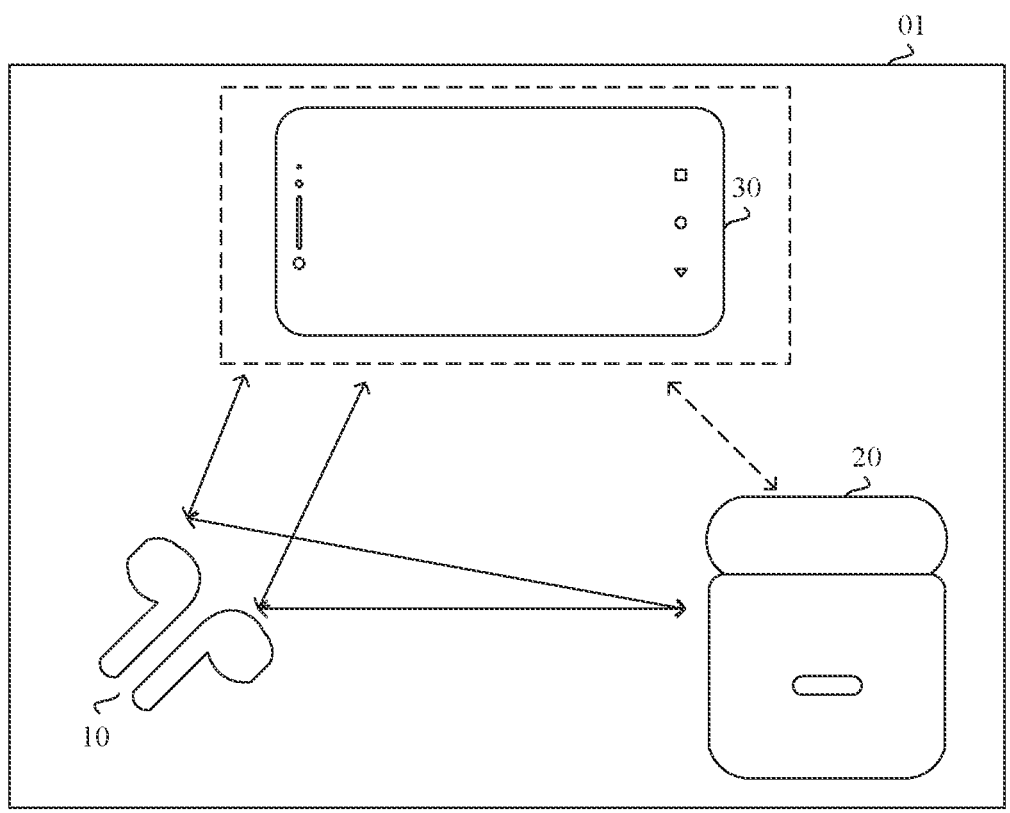
FIG. 6A is a schematic diagram of connections between a TWS headset, a charging case, and a mobile phone according to an embodiment of this application.

For example, refer to FIG. 6A. In the dual-feed connection solution, the mobile phone may separately establish a Bluetooth connection to each earbud of the TWS headset, to exchange audio data with each earbud. After the dual-feed connection solution is established between the TWS headset and the mobile phone, a Bluetooth connection between two earbuds may be maintained or disconnected. Similarly, a Bluetooth connection may be established between the charging case and each earbud of the TWS headset, to exchange audio data with each earbud.

Figure 6B:
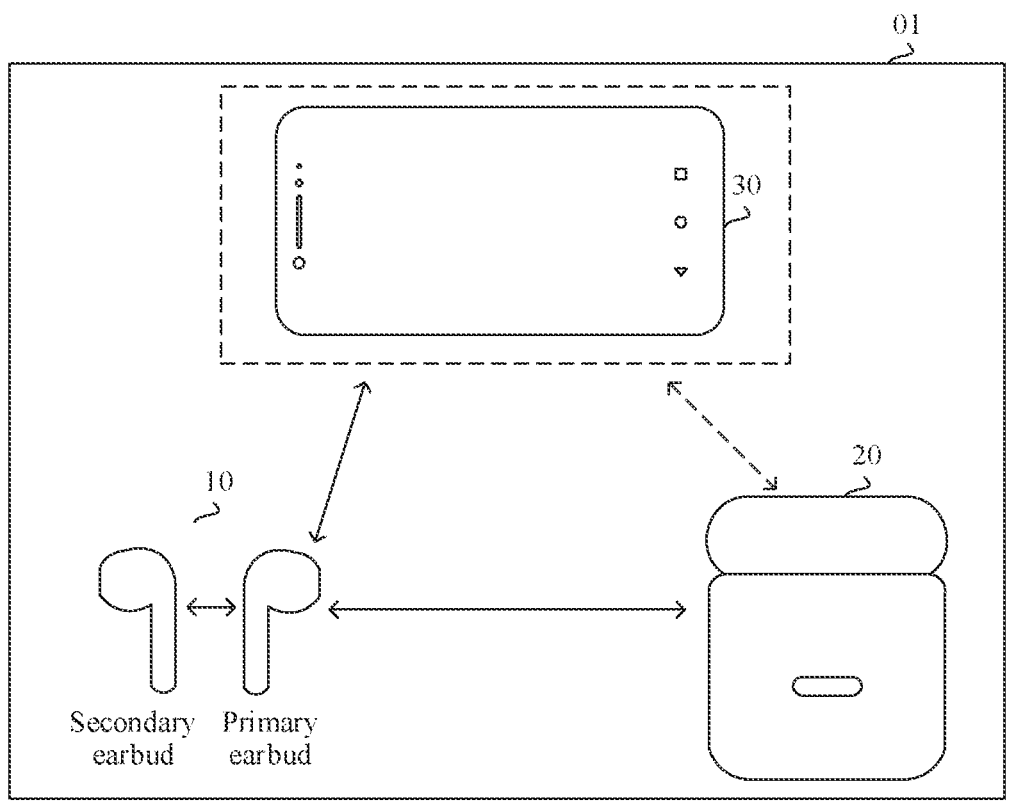
FIG. 6B is another schematic diagram of connections between a TWS headset, a charging case, and a mobile phone according to an embodiment of this application.

For example, refer to FIG. 6B. In the forwarding connection solution, the TWS headset may include a primary earbud and a secondary earbud. A Bluetooth connection is established between the primary earbud and the mobile phone, and audio data may be exchanged between the primary earbud and the mobile phone. A Bluetooth connection is established between the primary earbud and the secondary earbud, and the primary earbud forwards audio data to the secondary earbud through the Bluetooth connection between the primary earbud and the secondary earbud. Similarly, a Bluetooth connection is established between the charging case and the primary earbud, and audio data may be exchanged between the charging case and the primary earbud. The primary earbud may forward audio data to the secondary earbud. It should be noted that in a process in which the user uses the TWS headset, roles of the primary and secondary earbuds may be switched between each other.

Figure 7:
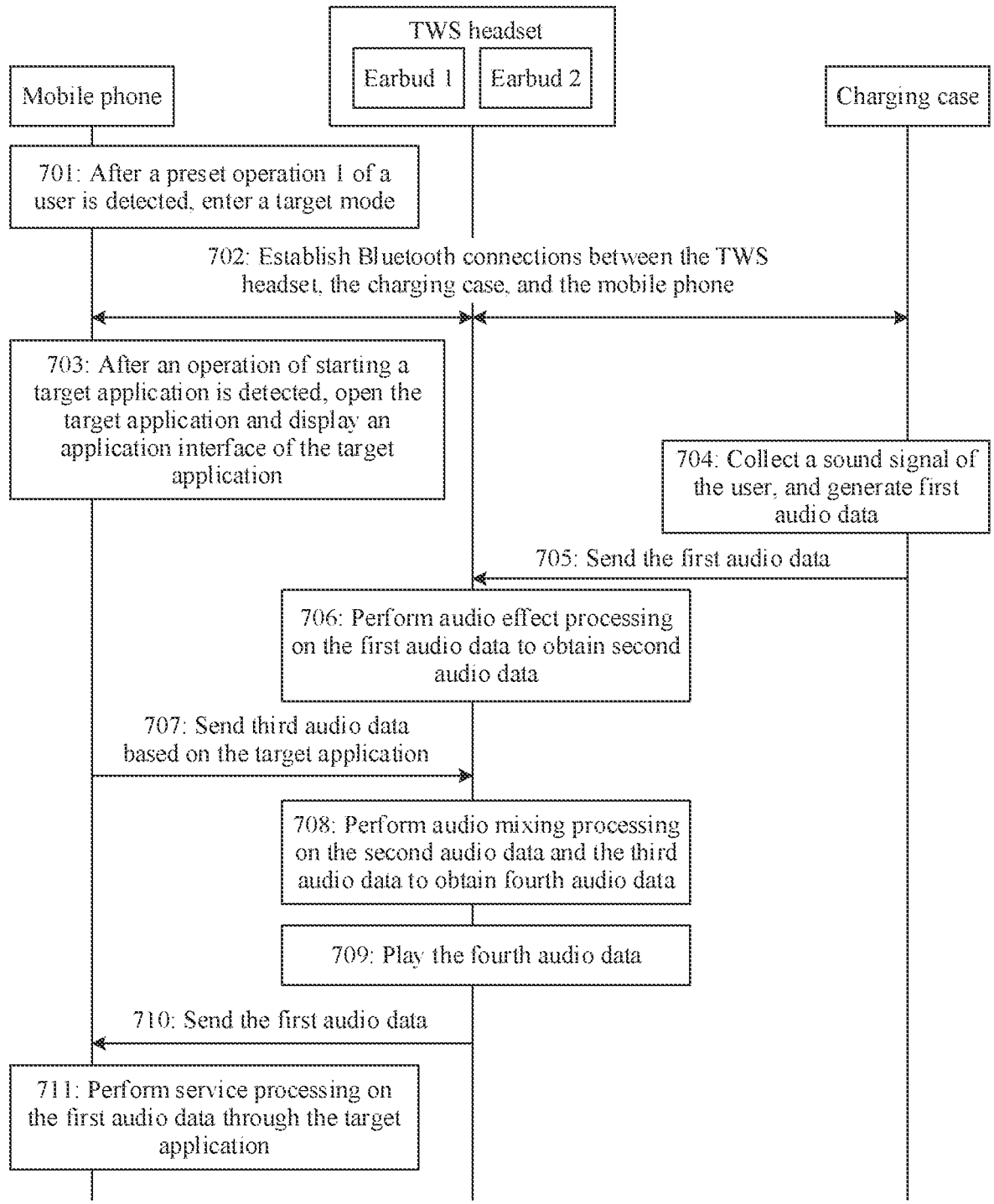
FIG. 7 is a flowchart of an audio processing method according to an embodiment of this application.

Refer to FIG. 7. In some embodiments, an embodiment of this application provides an audio processing method. The method may include the following steps.

701: After detecting a preset operation 1 of a user, a mobile phone enters a target mode.

In the target mode, Bluetooth connections may be established between the mobile phone, a TWS headset, and a charging case, and audio transmission is performed based on the Bluetooth connections. The charging case may collect a sound signal of the user, convert the sound signal into audio data, and send the audio data to the TWS headset. The TWS headset may return a voice of the user to the user for listenback.

The preset operation 1 may be a touch operation, a voice instruction operation, a gesture operation, or the like of the user. For example, the target mode may be a professional listenback mode shown in FIG. 8, and the preset operation 1 may be an operation of tapping a control 801 by the user.

Figure 8:
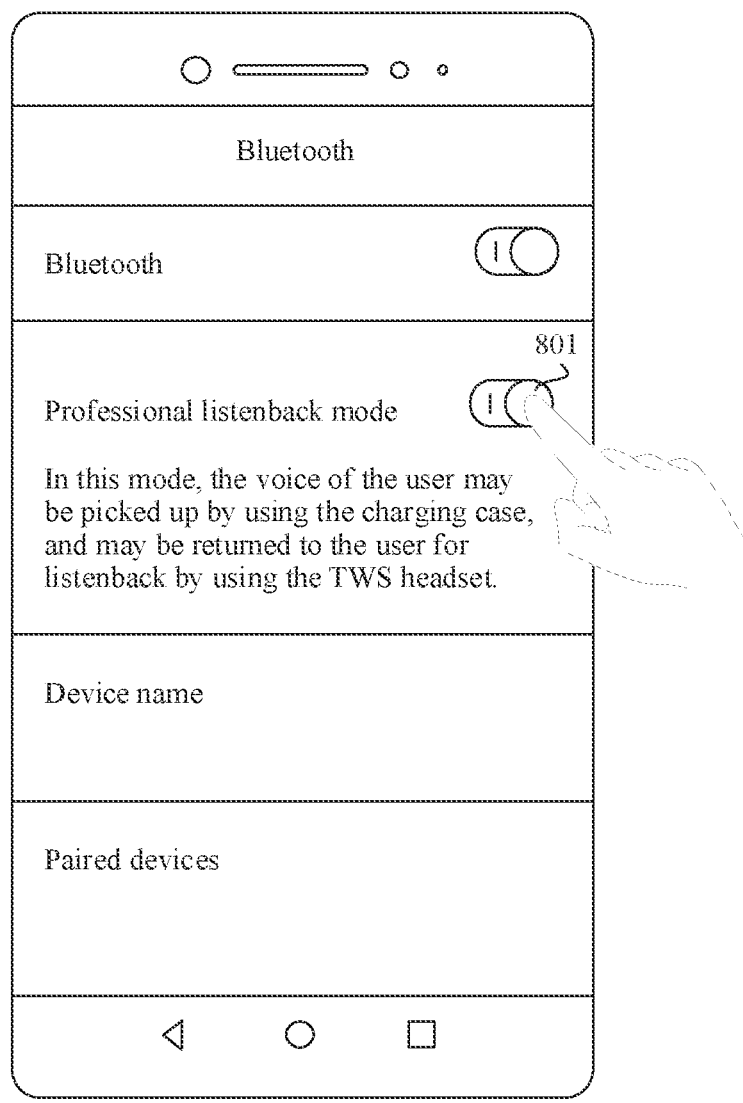
FIG. 8 is a schematic diagram of an interface of a mobile phone, according to an embodiment of this application.

In some embodiments, the mobile phone may further prompt the user with a function of the target mode. For example, as shown in FIG. 8, the target mode is a professional listenback mode, and a function of the professional listenback mode is as follows: In this mode, the voice of the user may be picked up by using the charging case, and may be returned to the user for listenback by using the TWS headset. It may be understood that the target mode may also be referred to as a charging case pickup mode or the like.

702: Establish the Bluetooth connections between the TWS headset the charging case, and the mobile phone.

In the target mode, there may be a plurality of solutions for establishing the Bluetooth connections between the TWS headset, the charging case, and the mobile phone. The following provides examples for descriptions.

Solution 1: The TWS headset and the charging case are used together at delivery. The TWS headset prestores a Bluetooth address of the charging case, and the charging case also prestores a Bluetooth address of the TWS headset. In the target mode, the mobile phone may first establish a Bluetooth connection to the TWS headset. Then, the mobile phone may send indication information 1 to the TWS headset, to indicate the TWS headset to establish a Bluetooth connection to the charging case. After receiving the indication information 1, the TWS headset requests, based on the stored Bluetooth address of the charging case, to establish the Bluetooth connection to the charging case. The charging case determines that a Bluetooth address of a device that requests to establish the Bluetooth connection matches the Bluetooth address of the TWS headset stored in the charging case, to establish the Bluetooth connection to the TWS headset. Optionally, a Bluetooth connection may also be established between the mobile phone and the charging case.

Alternatively, in the target mode, the mobile phone may first establish a Bluetooth connection to the charging case. Then, the mobile phone may send indication information 2 to the charging case, to indicate the charging case to establish a Bluetooth connection to the TWS headset. After receiving the indication information 2, the charging case requests, based on the stored Bluetooth address of the TWS headset, to establish the Bluetooth connection to the TWS headset. The TWS headset determines that a Bluetooth address of a device that requests to establish the Bluetooth connection matches the Bluetooth address of the charging case stored in the TWS headset, to establish the Bluetooth connection to the charging case.

The indication information 1 and the indication information 2 are used to indicate the TWS headset to establish the Bluetooth connection to the charging case, and therefore may also be referred to as connection information. The connection information from the mobile phone may include connection information directly sent by the mobile phone and connection information forwarded by the mobile phone through another device.

Solution 2: The TWS headset and the charging case are used together at delivery. The TWS headset prestores a Bluetooth address of the charging case, and the charging case also prestores a Bluetooth address of the TWS headset. In the target mode, the mobile phone may first establish a Bluetooth connection to the TWS headset. After detecting a preset operation 2 of the user, the TWS headset establishes a Bluetooth connection to the charging case.

The preset operation 2 may be a touch operation, a press operation, a voice operation, or the like. For example, the preset operation 2 is an operation of indicating, by the user through a voice, the TWS headset to establish the Bluetooth connection to the charging case. After detecting the preset operation 2, the TWS headset requests, based on the stored Bluetooth address of the charging case, to establish the Bluetooth connection to the charging case. After determining that a Bluetooth address of a device that requests to establish the Bluetooth connection matches the Bluetooth address of the TWS headset stored in the charging case, the charging case establishes the Bluetooth connection to the TWS headset.

Alternatively, the mobile phone may first establish a Bluetooth connection to the charging case, and after detecting a preset operation 3 of the user, the charging case establishes a Bluetooth connection to the TWS headset.

The preset operation 3 may be a touch operation, a press operation, a voice operation, or the like. For example, the preset operation 3 is an operation of continuously pressing a control 1 on the charging case twice by the user. After detecting the preset operation 3, the charging case requests, based on the stored Bluetooth address of the TWS headset, to establish the Bluetooth connection to the TWS headset. After determining that a Bluetooth address of a device that requests to establish the Bluetooth connection matches the Bluetooth address of the charging case stored in the TWS headset, the TWS headset establishes the Bluetooth connection to the charging case.

It may be understood that the preset operation 2 and the preset operation 3 may alternatively be other operations. This is not limited in this embodiment of this application. For example, the preset operation 2 may alternatively be an operation of continuously tapping a preset area on an earbud of the TWS headset three times by the user.

Solution 3: In the target mode, the mobile phone may establish a Bluetooth connection to the TWS headset, and establish a Bluetooth connection to the charging case. For example, in the target mode, the mobile phone may display a list of Bluetooth devices found through scanning. After detecting that the user selects the TWS headset and the charging case from the list of the Bluetooth devices, the mobile phone establishes the Bluetooth connection to each of the TWS headset and the charging case. Then, the mobile phone may indicate the TWS headset and the charging case to establish a Bluetooth connection. For example, the mobile phone may send a Bluetooth address of the TWS headset to the charging case, and send a Bluetooth address of the charging case to the TWS headset. The Bluetooth connection is established between the TWS headset and the charging case based on the Bluetooth addresses sent by the mobile phone. In this solution, the TWS headset and the charging case may be used together at delivery, or may not be used together at delivery. This is not limited in embodiments of this application.

The foregoing uses an example in which the Bluetooth connections are established between the TWS headset, the charging case, and the mobile phone after the mobile phone enters the target mode for descriptions. In some other embodiments, the mobile phone may first establish a Bluetooth connection to the TWS headset, and after entering the target mode, the mobile phone indicates the TWS headset to establish a Bluetooth connection to the charging case. Optionally, after entering the target mode, the mobile phone may further establish a Bluetooth connection to the charging case.

703: After detecting an operation performed by the user to start a target application, the mobile phone opens the target application and displays an application interface of the target application.

When using the target application, the user needs to listen back to his/her own voice. When the user uses the target application, the charging case may collect a sound signal of the user, convert the sound signal of the user into audio data, and send the audio data to the TWS headset. The TWS headset may return the voice of the user to the user for listenback.

Figure 9:
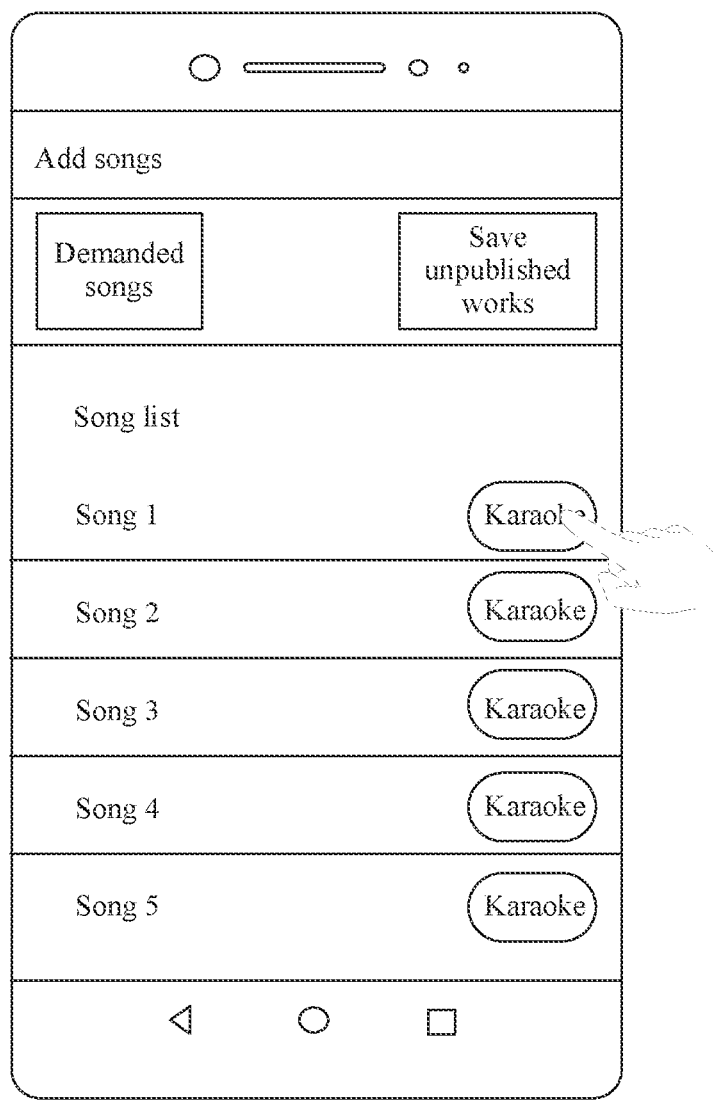
FIG. 9 is a schematic diagram of another interface of a mobile phone according to an embodiment of this application.

For example, the target application may be a karaoke application, a live broadcast application, or the like. For example, the target application is a karaoke application. The operation performed by the user to start the target application may be an operation of tapping an icon of the target application on a home screen. For the application interface of the target application displayed by the mobile phone, refer to FIG. 9.

704: The charging case collects the sound signal of the user, and generates first audio data.

The user may place the charging case near the mouth, and a microphone of the charging case may collect a surrounding sound signal. The surrounding sound signal mainly includes the sound signal of the user, for example, a sound emitted by the mouth of the user or a tune hummed by the nose. For example, the sound signal of the user may be a voice of a user speech, a voice of a moderator speech, a voice of a user singing, or the like.

The charging case may convert the sound signal of the user into the first audio data. The sound signal of the user may be an analog signal, and the first audio data may be a digital signal. For example, the first audio data may be pulse code modulation (pulse code modulation. PCM) data.

In some embodiments, when there is no Bluetooth connection between the mobile phone and the charging case, after opening the target application (for example, the karaoke application), the mobile phone may indicate, by using the TWS headset, the charging case to perform sound pickup. When the Bluetooth connection is established between the mobile phone and the charging case, after opening the target application, the mobile phone may indicate, based on the Bluetooth connection, the charging case to perform sound pickup.

In some other embodiments, after opening the target application, the mobile phone may indicate, based on the target application, the charging case to start sound pickup. For example, the target application is a karaoke application. After the user selects a to-be-sung song (for example, a song 1 shown in FIG. 9) from the karaoke application, the mobile phone indicates the charging case to start sound pickup, or indicates, by using the TWS headset, the charging case to start sound pickup.

In some other embodiments, the charging case starts sound pickup immediately after establishing the Bluetooth connection to the TWS headset. When the mobile phone needs to process sound pickup data of the charging case, the mobile phone performs service processing on the sound pickup data from the charging case. The sound pickup data is the foregoing first audio data. The sound pickup data from the charging case may be sound pickup data sent by the charging case, or may be sound pickup data forwarded by the charging case through the TWS headset. For example, the target application is a karaoke application. After the user selects a to-be-sung song from the karaoke application, the mobile phone determines that sound pickup data of the charging case needs to be processed and subsequently received sound pickup data of the charging case is valid data, to perform related processing based on the subsequently received sound pickup data.

In some other embodiments, the charging case starts sound pickup after detecting a preset operation 4 of the user. For example, the preset operation 4 may be a press operation of the user on a preset control on the charging case, a voice operation of the user, or the like.

In some other embodiments, after detecting a preset operation 5 of the user, the TWS headset indicates the charging case to start sound pickup. For example, the preset operation 5 may be a touch operation performed by the user in the preset area on the earbud, a voice operation performed by the user, or the like.

As described above, the architecture of the Bluetooth connections between the TWS headset, the charging case, and the mobile phone may include Case 1 shown in FIG. 5A and Case 2 shown in FIG. 5B. The following first describes Case 1 shown in FIG. 5A.

705: The charging case sends the first audio data to the TWS headset.

As described above, a Bluetooth connection solution between the TWS headset and the charging case may be a dual-feed connection solution shown in FIG. 6A, a forwarding connection solution shown in FIG. 6B, or the like. The following first uses the dual-feed connection solution shown in FIG. 6A as an example for descriptions, and the forwarding connection solution shown in FIG. 6B is described below.

In a case in which the dual-feed connection solution is used between the TWS headset and the charging case shown in FIG. 6A, the charging case may send the first audio data to an earbud 1 and an earbud 2 in the TWS headset by using a Bluetooth module. Content of data separately sent by the charging case to the earbud 1 and the earbud 2 may be the same or different. For example, the first audio data is mono audio data, and the charging case sends same mono audio data to the earbud 1 and the earbud 2. For another example, the first audio data includes left channel audio data and right channel audio data, the content of the data sent by the charging case to the earbud 1 is the left channel audio data in the first audio data, and the content of the data sent by the charging case to the earbud 2 is the right channel audio data in the first audio data.

706: The TWS headset performs audio effect processing on the first audio data to obtain second audio data.

The first audio data may be a dry sound of the voice of the user, and may be PCM data obtained by the microphone of the charging case.

The audio effect processing is to perform processing such as reverberation, modulation, compression and limiting, or speed adjustment on the first audio data, to implement a better sound quality effect. For example, an audio effect processing algorithm may include one or more of the following items: an acoustic echo cancellation (acoustic echo cancellation, AEC) algorithm, a noise suppression (noise suppression, NS) algorithm, an automatic gain control (automatic gain control, AGC) algorithm, an equalizer (equalizer) algorithm, an active noise cancellation (active noise cancellation, NC) algorithm, a voice activity detection (voice activity detection, VAD) algorithm, a dynamic range compression (dynamic range compress, DRC) algorithm, or the like.

After receiving the first audio data, the earbud 1 and the earbud 2 of the TWS headset each may perform audio effect processing on the first audio data by using an internal audio effect processing module, to obtain fifth audio data and sixth audio data. The fifth audio data and the sixth audio data may be the same or different. For example, the fifth audio data and the sixth audio data are same mono audio data. For another example, the fifth audio data is left channel audio data, and the sixth audio data is right channel audio data. The second audio data may include the fifth audio data and the sixth audio data, and the second audio data may be a wet sound of the voice of the user.

707: The mobile phone sends third audio data to the TWS headset based on the target application.

The third audio data may be audio data that is sent by the mobile phone based on the target application and that cooperates with the sound pickup data of the charging case. For example, the sound pickup data of the charging case may be audio data corresponding to a human voice during karaoke, and the third audio data may be an accompaniment sent by the mobile phone during karaoke.

For example, the target application is a karaoke application. After the user selects a to-be-sung song, the mobile phone may send an accompaniment of the song to the charging case or send an accompaniment of the song to the charging case by using the TWS headset.

In some embodiments, after the user selects a to-be-sung song, the mobile phone may further indicate the charging case to start sound pickup.

The mobile phone may send the third audio data to the earbud 1 and the earbud 2 of the TWS headset. Content of data sent by the mobile phone to the two earbuds of the TWS headset may be the same or may be different. For example, the third audio data is a mono accompaniment, and the mobile phone may send a same mono accompaniment to each of the earbud 1 and the earbud 2. For another example, the third audio data includes a left channel accompaniment and a right channel accompaniment. The mobile phone may send the left channel accompaniment in the third audio data to the earbud 1, and send the right channel accompaniment in the third audio data to the earbud 2.

708: The TWS headset performs audio mixing processing on the second audio data and the third audio data to obtain fourth audio data.

The audio mixing processing is to integrate a plurality of pieces of audio data into one piece of audio data. For example, the audio mixing processing algorithm may include at least one of the following items: an averaging algorithm after linear superposition, a normalized audio mixing algorithm (also referred to as an adaptive weighted audio mixing algorithm), a resampling algorithm, or the like.

The earbud 1 and the earbud 2 each may perform audio mixing processing on the second audio data and the third audio data by using the internal audio mixing processing module, to obtain the fourth audio data. For example, in a karaoke scenario, the earbud 1 and the earbud 2 may obtain audio data obtained after the wet sound of the user is mixed with the accompaniment.

Specifically, the earbud 1 may perform audio mixing processing on the fifth audio data and the third audio data that is received from the mobile phone, to obtain seventh audio data. The earbud 1 may perform audio mixing processing on the sixth audio data and the third audio data that is received from the mobile phone, to obtain eighth audio data. The seventh audio data and the eighth audio data may be the same or different. For example, the seventh audio data and the eighth audio data are same mono audio data. For another example, the seventh audio data is left channel audio data, and the eighth audio data is right channel audio data. The fourth audio data includes the seventh audio data and the eighth audio data.

709: The TWS headset plays the fourth audio data.

Each of the earbud 1 and the earbud 2 may play, to the user by using the earpiece, the fourth audio data obtained after audio mixing processing. Because the fourth audio data is audio data obtained after audio mixing is performed on the second audio data and the third audio data, and the second audio data is audio data obtained after audio effect processing is performed on the first audio data corresponding to the sound signal of the user, the earbud 1 and the earbud 2 play the fourth audio data to the user, to return the voice of the user to the user for listenback.

For example, in the karaoke scenario, the earbud 1 and the earbud 2 may play, to the user, the audio data obtained after the wet sound of the user is mixed with the accompaniment, and the user may hear his/her own voice and the accompaniment.

In some embodiments, the earbud 1 and the earbud 2 play the same audio data. For example, both the earbud 1 and the earbud 2 play the fourth audio data, and the fourth audio data is mono audio data. In some other embodiments, the earbud 1 and the earbud 2 play different audio data. For example, the earbud 1 plays left channel audio data in the fourth audio data, and the earbud 2 plays right channel audio data in the fourth audio data.

In the solution described in steps 701 to 709, the charging case sends the first audio data to the TWS headset, and the TWS headset obtains the second audio data after performing audio effect processing. The mobile phone sends the third audio data to the TWS headset, and the TWS headset performs audio mixing processing on the second audio data and the third audio data to obtain the fourth audio data. The TWS headset plays the fourth audio data to the user.

In this way, a microphone configured to pick up the sound signal of the user is a microphone of the charging case, and an earpiece configured for listenback of the sound signal of the user is an earpiece of the TWS headset. That is, the microphone configured to pick up the sound signal of the user may be separated from the earpiece for listenback of the sound signal of the user. The user may hold the charging case and place the charging case close to the mouth of the user. The charging case may pick up details of a voice of the user, a signal-to-noise ratio of the picked-up voice of the user is high, and sound pickup quality and a sound pickup effect of the charging case are good. In addition, the earpiece of the TWS headset is also very close to an ear of the user, and an audio playing effect is good. Therefore, a listenback effect is good.

Therefore, this solution can break a limitation that the earpiece of the TWS headset and a sound pickup device are close to each other, and can further get rid of a trouble of a connection cable of wired transmission or a non-TWS headset, in addition, when the user uses the two earbuds, according to the solution, the user listens back to his/her own voice, and listening experience such as immersive accompaniment may be provided for the user. In addition, a size of the charging case may be convenient for the user to hold and use.

In the karaoke scenario, due to reasons such as a large accompaniment sound or a noisy environment, the karaoke user may not clearly hear his/her own voice or hear his/her own voice with a delay through sound propagation in the air. In this case, the karaoke user needs to listen back to his/her own voice in real time to prevent out of tone or out of tune, to help the user better adjust a singing skill, a singing status, and the like.

In this embodiment of this application, when the target application is a karaoke application, the first audio data may be a dry sound of a karaoke voice of the user, the second audio data may be a wet sound of the karaoke voice of the user, the third audio data may be an accompaniment delivered by the mobile phone, and the fourth audio data may be audio data obtained by mixing the wet sound of the karaoke voice of the user and the accompaniment. That is, the charging case may pick up a sound signal of the user during karaoke, convert the sound signal into sound pickup data, and send the sound pickup data to the TWS headset for audio effect processing. The TWS headset can also receive an accompaniment from the mobile phone. The TWS headset may mix the sound pickup data obtained after audio effect processing with the accompaniment, and then play mixed sound to the user. In this way, the microphone used for sound pickup and the earpiece used for audio playing may be separated, the earpiece of the headset may be close to the ear of the user, and the microphone of the charging case may be close to the mouth of the user. Therefore, sound details are not easily missing, the signal-to-noise ratio is high, the sound pickup quality and the sound pickup effect are good, and the listenback effect is also good. In addition, when the user uses the two earbuds, the user may further obtain immersive karaoke experience while monitoring whether his/her own voice is out of tone.

In some other embodiments, step 706 may be omitted. In other words, the TWS headset may not perform audio effect processing on the first audio data, and therefore does not generate the second audio data. In the foregoing step 708, the TWS headset obtains the fourth audio data after performing audio mixing processing on the first audio data and the third audio data. In the foregoing step 709, the TWS headset plays the fourth audio data obtained after audio mixing processing is performed on the first audio data and the third audio data.

In some embodiments, the TWS headset may alternatively send the first audio data to the mobile phone, so that the target application of the mobile phone performs related processing based on the first audio data. For example, refer to FIG. 7. After step 705, the method may further include the following steps.

710: The TWS headset sends the first audio data to the mobile phone.

At least one of the earbud 1 or the earbud 2 may send the first audio data to the mobile phone. In an implementation solution, the earbud that is of the TWS headset and used to send the first audio data to the mobile phone may be a preset earbud. In another implementation solution, the earbud that is of the TWS headset and used to send the first audio data to the mobile phone may be a primary earbud.

In another implementation solution, both the earbud 1 and the earbud 2 send the first audio data to the mobile phone. The mobile phone receives the first audio data sent by each of the two earbuds. Alternatively, after receiving the first audio data sent by one earbud, the mobile phone no longer receives the same first audio data sent by the other earbud. Alternatively, the mobile phone discards the first audio data sent by one earbud. For example, the first audio data is mono audio data, or the first audio data includes left channel audio data and right channel audio data.

In another implementation solution, the first audio data includes left channel audio data and right channel audio data. The earbud 1 may send the left channel audio data in the first audio data to the mobile phone, and the earbud 2 may send the right channel audio data in the first audio data to the mobile phone.

In some embodiments, the mobile phone receives the first audio data from the charging case when determining that application processing needs to be performed based on the first audio data. For example, the target application is a karaoke application. After the user selects a to-be-sung song, the mobile phone receives the first audio data from the charging case after determining that the subsequent first audio data from the charging case is valid data. Before the user selects the to-be-sung song, the mobile phone does not receive the first audio data sent by the TWS headset.

711: The mobile phone performs service processing on the first audio data through the target application.

The mobile phone may perform related service processing on the first audio data through the target application. In some embodiments, the mobile phone may receive the first audio data from the charging case, and perform service processing on the subsequently received first audio data when service processing needs to be performed on the first audio data. For example, the target application is a karaoke application. After the user selects a to-be-sung song, the mobile phone determines that service processing needs to be performed on the first audio data. The first audio data is audio data corresponding to a sound signal of the user during karaoke. The mobile phone may record the first audio data through the karaoke application, synthesize the first audio data with an accompaniment to generate an audio file, and perform other processing such as playing the audio file or uploading the audio file.

In some other embodiments, the mobile phone indicates the charging case to perform sound pickup when service processing needs to be performed on the first audio data. In this way, the mobile phone receives the first audio data from the charging case when service processing needs to be performed on the first audio data. After receiving the first audio data, the mobile phone may perform service processing on the first audio data through the target application.

In some other embodiments, the charging case may be further provided with an audio codec (codec), for example, a high-definition Bluetooth codec. Because a transmission bandwidth of Bluetooth is limited, and an encoding operation of the audio codec can reduce a data amount of audio data, a sampling rate of the microphone of the charging case for the sound signal may be large. In this way, a data amount of encoded audio data corresponding to the sound signal is still small, and can still be quickly transmitted within the transmission bandwidth of Bluetooth. A larger sampling rate of the sound signal indicates a larger bandwidth of sound information that can be reserved after audio data corresponding to the sound signal is encoded and decoded. For example, when the sampling rate of the microphone is 48 kHz, a bandwidth range of the sound information obtained after encoding and decoding may be about 0 kHz to 24 kHz. When the sampling rate of the microphone is 32 kHz, a bandwidth range of the sound information obtained after encoding and decoding may be about 0 kHz to 16 kHz. Therefore, sound information with a high bandwidth can be obtained by using the audio codec, and audio data can be transmitted in real time and quickly through Bluetooth.

In the foregoing step 704, the microphone of the charging case may collect the sound signal of the user at the sampling rate greater than or equal to 16 kHz, for example, 48 kHz or 32 kHz, and generate the first audio data based on the sound signal of the user. In the foregoing step 705, the charging case may encode the first audio data by using the audio codec, and then send encoded first audio data to the TWS headset by using a Bluetooth module. In this way, a data amount of the encoded first audio data is small, and the encoded first audio data can be transmitted at a high speed through Bluetooth. In addition, the encoded first audio data may retain a high-bandwidth (for example, a bandwidth of 0 to 24 kHz or 0 to 16 kHz) of sound information, so that real and clear user voice information can be retained. Therefore, the audio codec may also be referred to as a high-definition Bluetooth codec.

The earbud of the TWS headset may also be provided with an audio codec. After the TWS headset receives the encoded first audio data, in the foregoing step 706, the TWS headset decodes the encoded first audio data to obtain the first audio data, and performs audio effect processing on the first audio data to obtain the second audio data.

In the foregoing step 707, the mobile phone sends third audio data encoded by the audio codec to the TWS headset.

In the foregoing step 708, the TWS headset decodes the encoded third audio data by using the audio codec, to obtain the third audio data, and performs audio mixing processing on the second audio data and the third audio data to obtain the fourth audio data.

In the foregoing step 710, the TWS headset may send the encoded first audio data to the mobile phone. The mobile phone may be provided with an audio codec. In the foregoing step 711, the mobile phone may obtain the first audio data after decoding the encoded first audio data, to perform service processing on the first audio data through the target application.

In this solution, each of the charging case, the TWS headset, and the mobile phone is provided with the audio codec (or only the charging case may be further provided with the audio codec). The audio codec may compress audio data obtained at the high sampling rate to a low amount of data, to quickly transmit the audio data through Bluetooth, so that sound pickup data of the charging case can be transmitted to the TWS headset and the mobile phone in real time and quickly, and audio data sent by the mobile phone can also be transmitted to the TWS headset in real time and quickly. Therefore, high-bandwidth Bluetooth audio pickup and audio transmission can be implemented, and real-time listenback of the voice of the user can be implemented.

In addition, the codec is a system-level Bluetooth codec, may be applied to various types of audio data, may be applied to various system applications and third-party applications, and is a universal Bluetooth audio data encoding and decoding manner.

It may be understood that, when the user uses the target application that requires listenback, the mobile phone needs to first start the target application, and Bluetooth connections need to be preestablished between the TWS headset, the charging case, and the mobile phone. The process may be implemented in a plurality of manners. For example, the process may be the process described in the foregoing steps 701 to 703.

Figure 10:
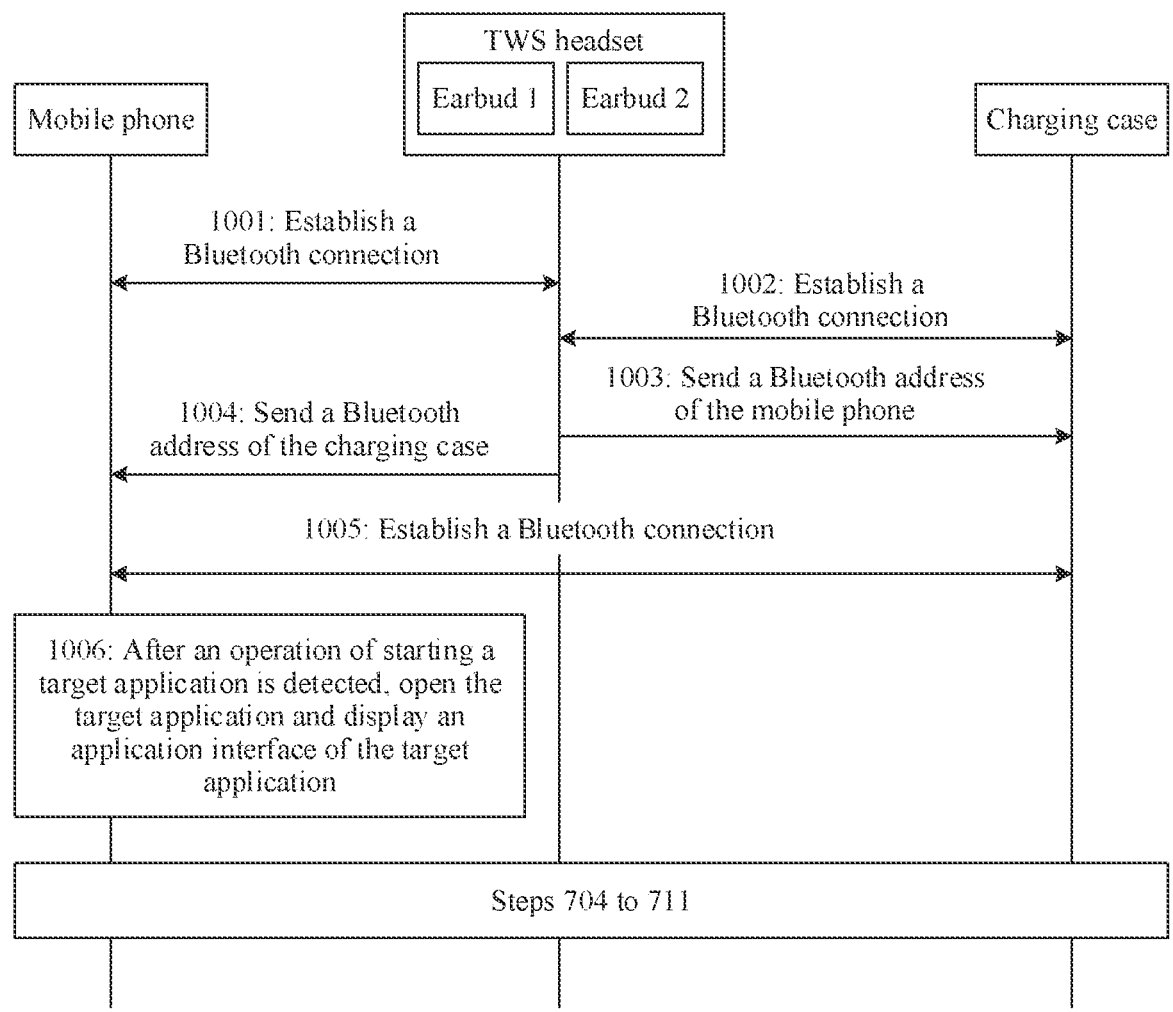
FIG. 10 is a flowchart of another audio processing method according to an embodiment of this application.

Refer to FIG. 10. In some other embodiments, the procedure described in steps 701 to 703 may be replaced with the following steps.

1001: A mobile phone establishes a Bluetooth connection to a TWS headset.

For example, the mobile phone displays a list of Bluetooth devices found through scanning, and after detecting an operation performed by a user to select the TWS headset from the list, the mobile phone establishes the Bluetooth connection to the TWS headset. For another example, the mobile phone has previously established a Bluetooth connection to the TWS headset, and the TWS headset automatically reconnects to the mobile phone.

1002: The TWS headset establishes a Bluetooth connection to a charging case.

In some embodiments, the TWS headset and the charging case are used together at delivery. The TWS headset prestores a Bluetooth address of the charging case, and the charging case also prestores a Bluetooth address of the TWS headset. After detecting a preset operation 2 of the user, the TWS headset establishes the Bluetooth connection to the charging case. Alternatively, after detecting a preset operation 3 of the user, the charging case establishes the Bluetooth connection to the TWS headset.

Optionally, after step 1002, the procedure may further include step 1003.

1003: The TWS headset sends a Bluetooth address of the mobile phone to the charging case.

1004: The TWS headset sends the Bluetooth address of the charging case to the mobile phone.

1005: The mobile phone establishes the Bluetooth connection to the charging case based on the Bluetooth address of the charging case and the Bluetooth address of the mobile phone that are sent by the TWS headset.

The mobile phone may send a Bluetooth connection request to the charging case based on the Bluetooth address of the charging case sent by the TWS headset, and the charging case determines that a Bluetooth address of a device that requests a Bluetooth connection matches the Bluetooth address of the charging case sent by the TWS headset, to establish the Bluetooth connection to the mobile phone.

Based on steps 1003 to 1005, the Bluetooth connection is also established between the mobile phone and the charging case, and may be used for audio data transmission.

Further, the procedure may further include the following steps.

1006: After detecting an operation performed by the user to start a target application, the mobile phone opens the target application and displays an application interface of the target application.

Figure 11A:
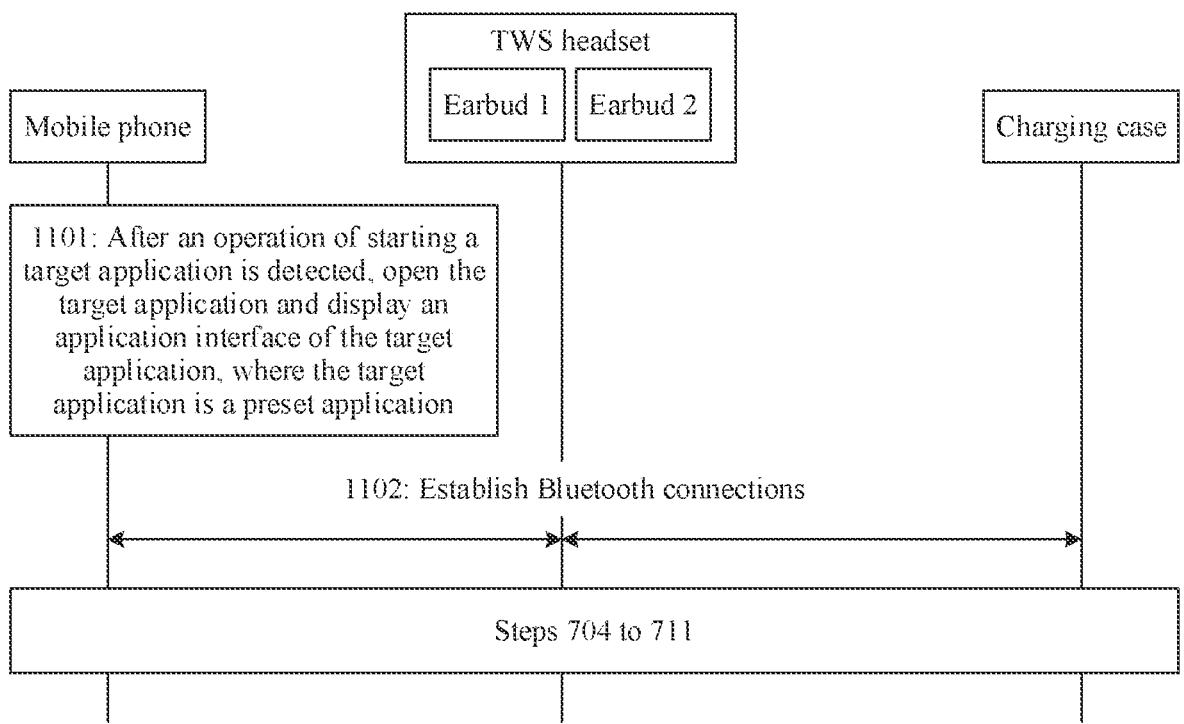
FIG. 11A is a flowchart of establishing a Bluetooth connection according to an embodiment of this application.

Refer to FIG. 11A. In some other embodiments, the procedure described in steps 701 to 703 may be replaced with the following steps.

1101: After detecting an operation performed by a user to start a target application, a mobile phone opens the target application and displays an application interface of the target application, where the target application is a preset application.

Figure 11B:
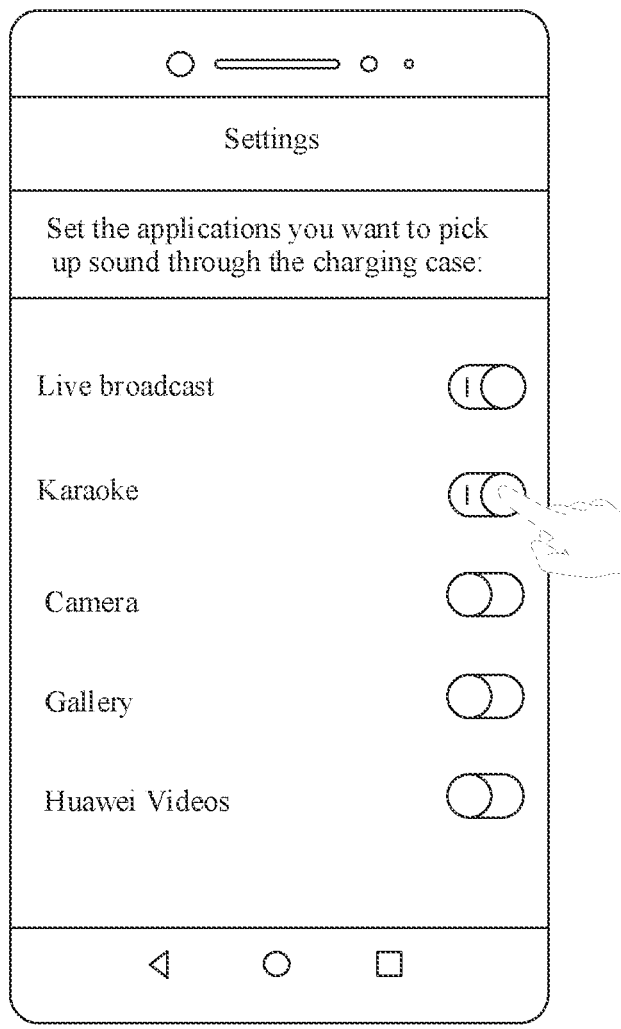
FIG. 11B is a schematic diagram of still another interface of a mobile phone according to an embodiment of this application.

The preset application is an application preset by a system or the user, and the preset application may perform related processing on sound pickup data from a charging case. For example, for an interface for setting the preset application by the user, refer to FIG. 11B.

102: Establish the Bluetooth connections between a TWS headset, the charging case, and the mobile phone.

Similar to processes of establishing the Bluetooth connections between the TWS headset, the charging case, and the mobile phone in the target mode, for processes of establishing the Bluetooth connections between the TWS headset, the charging case, and the mobile phone after the mobile phone detects an operation performed by the user to start the target application, refer to related descriptions in step 702. Details are not described herein again.

Figure 12A:
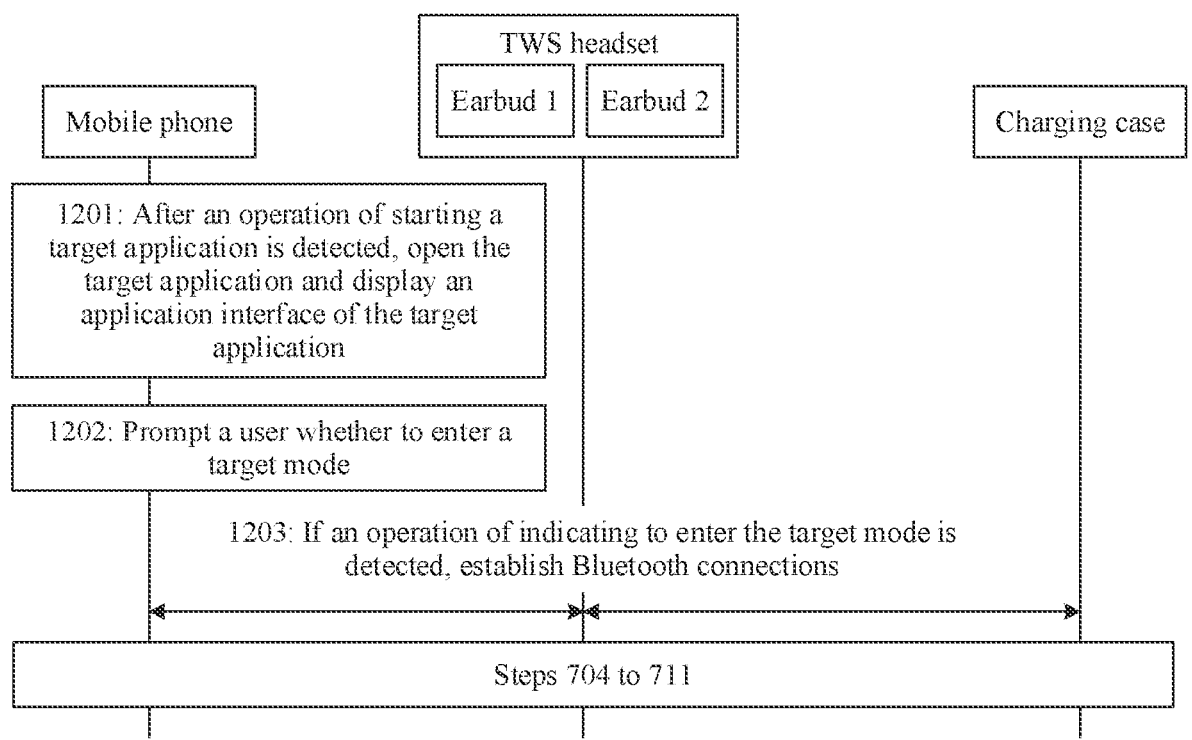
FIG. 12A is another flowchart of establishing a Bluetooth connection according to an embodiment of this application.

Refer to FIG. 12A. In other embodiments, the procedure described in steps 701 to 703 may be replaced with the following steps.

1201: After detecting an operation performed by a user to start a target application, a mobile phone opens the target application and displays an application interface of the target application.

1202: The mobile phone prompts the user whether to enter a target mode.

After opening the target application, the mobile phone may prompt the user whether to enter the target mode. In the target mode, Bluetooth connections may be established between a TWS headset, a charging case, and the mobile phone, and the charging case may pick up sound.

Figure 12B:
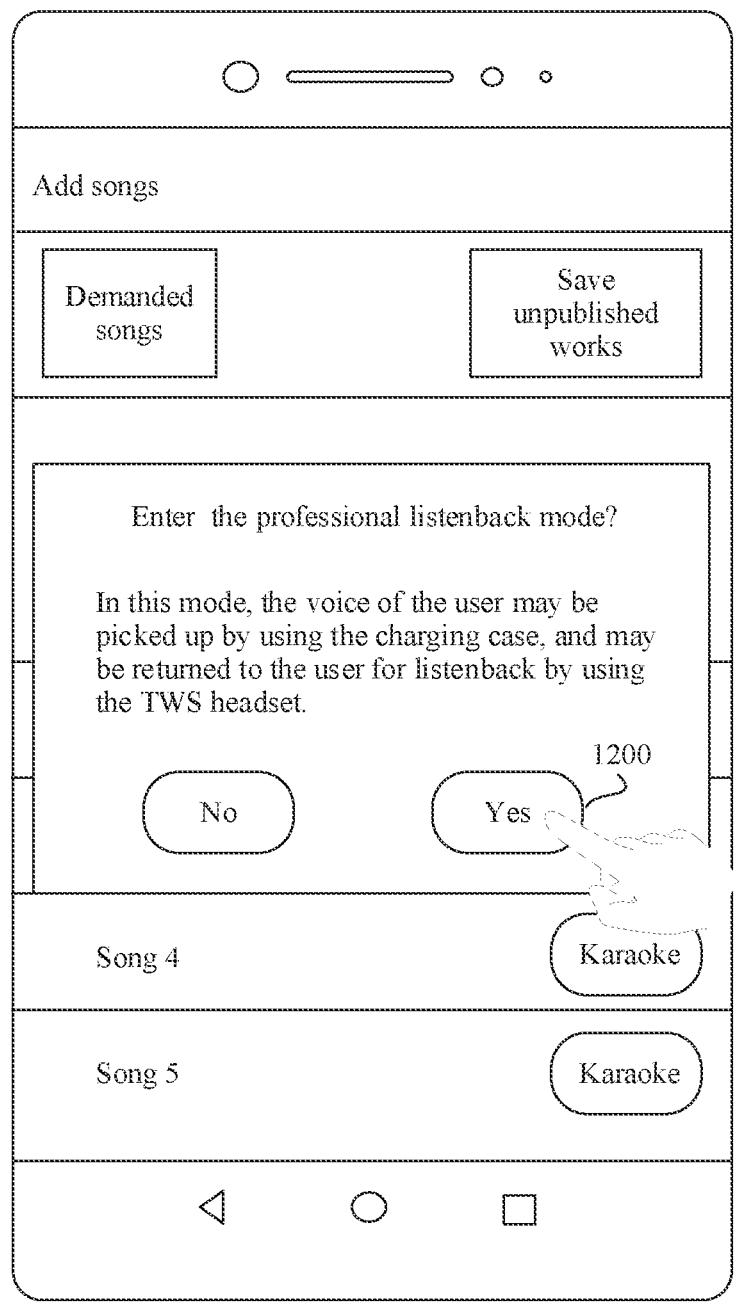
FIG. 12B is a schematic diagram of yet another interface of a mobile phone according to an embodiment of this application.

For example, for a schematic diagram of an interface for prompting, by the mobile phone, the user whether to enter the target mode, refer to FIG. 12B. As shown in FIG. 12B, the target mode is a professional listenback mode, and the target mode may also be referred as a professional karaoke mode or the like.

1203: If the mobile phone detects an operation performed by the user to indicate to enter the target mode, the mobile phone establishes the Bluetooth connections to the TWS headset and the charging case.

For example, in a case shown in FIG. 12B, the operation performed by the user to indicate to enter the target mode may be an operation of tapping a control 1200.

For specific processes of establishing the Bluetooth connections to the TWS headset and the charging case by the mobile phone in step 1203, refer to related descriptions in step 702.

Based on the solution shown in FIG. 11A or FIG. 12A, for subsequent step 704, in some embodiments, after the mobile phone starts the target application and the charging case establishes the Bluetooth connection to the TWS headset, the mobile phone may indicate, based on the target application, the charging case to start sound pickup. In some other embodiments, after establishing the Bluetooth connection to the TWS headset, the charging case may start sound pickup. In some other embodiments, the charging case starts sound pickup after detecting a preset operation 4 of the user. In some other embodiments, after detecting a preset operation 5 of the user, the TWS headset indicates the charging case to start sound pickup.

It should be noted that, in embodiments of this application, there is no specific sequence relationship between steps of establishing the Bluetooth connections between the TWS headset, the charging case, and the mobile phone and the step of starting the target application by the mobile phone. This is not limited. After the mobile phone opens the target application, the Bluetooth connections are established between the TWS headset, the charging case, and the mobile phone. Alternatively, after the Bluetooth connections are established between the TWS headset, the charging case, and the mobile phone, the mobile phone may open the target application.

The foregoing mainly describes the solution in which the dual-feed connection is used between the TWS headset and the charging case and between the TWS headset and the mobile phone shown in FIG. 6A. The following describes a solution in which the forwarding connections are used between the TWS headset and the charging case and between the TWS headset and the mobile phone shown in FIG. 6B.

Figure 13:
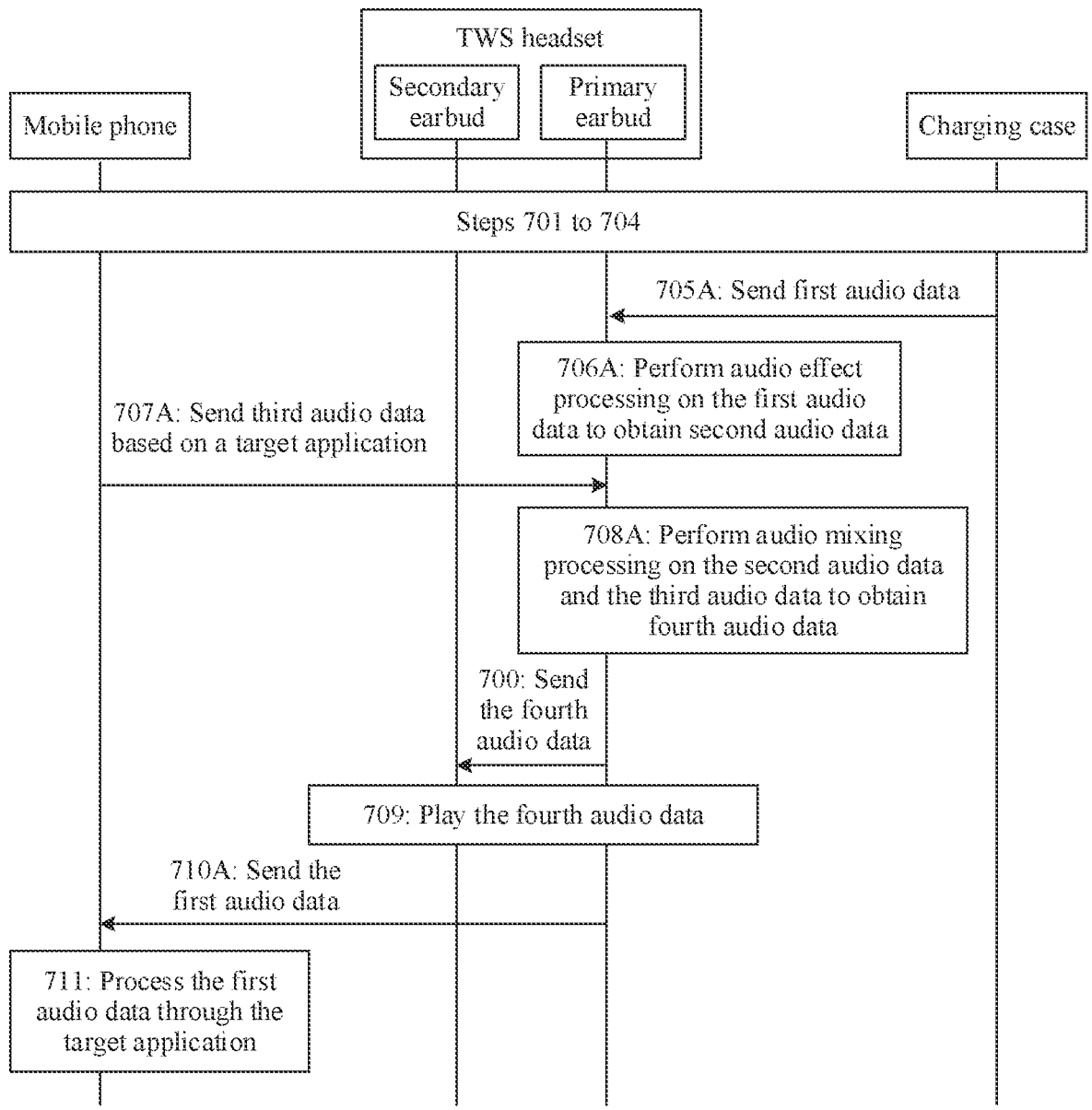
FIG. 13 is a flowchart of still another audio processing method according to an embodiment of this application.

Refer to FIG. 13. Step 705 may be replaced with the following step.

705A: The charging case sends first audio data to the primary earbud of the TWS headset.

A pair of earbuds of the TWS headset may include the primary earbud and the secondary earbud, and roles of the primary earbud and the secondary earbud may be determined based on a preset policy. For example, the primary earbud is an earbud that is first taken out from the charging case. For another example, the primary earbud is an earbud that is first worn by the user on an ear. For another example, the primary earbud is an earbud with a high battery level.

In addition, the roles of the primary earbud and the secondary ear bud may be further switched in a use process of the user. For example, the primary earbud is an earbud with a high battery level, and after battery levels of the two earbuds change, the roles of the primary earbud and the secondary earbud may be switched.

After generating the first audio data, the charging case may send the first audio data to the primary earbud of the TWS headset by using a Bluetooth module, and the charging case does not send the first audio data to the secondary ear bud.

Step 706 may be replaced with the following step.

706A: The primary earbud performs audio effect processing on the first audio data to obtain second audio data.

The primary earbud may perform audio effect processing on the first audio data by using an internal audio effect processing module, to obtain the second audio data.

Step 707 may be replaced with the following step.

707A: The mobile phone sends third audio data to the primary earbud based on the target application.

The mobile phone may send the third audio data to the primary earbud, and does not send the third audio data to the secondary earbud.

Step 708 may be replaced with the following step.

708A: The primary earbud performs audio mixing processing on the second audio data and the third audio data to obtain fourth audio data.

Before step 709, the method may further include the following step.

700: The primary earbud sends the fourth audio data to the secondary earbud.

In this solution, the charging case sends the first audio data to the primary earbud, and the primary earbud obtains the second audio data after performing audio effect processing on the first audio data. The mobile phone sends the third audio data to the primary earbud, and obtains the fourth audio data after performing audio mixing processing on the second audio data and the third audio data. The primary earbud sends the fourth audio data obtained through processing to the secondary earbud. In this way, in step 709, both the primary earbud and the secondary earbud can play the fourth audio data.

In some embodiments, the fourth audio data is mono audio data, and both the primary earbud and the secondary earbud play the mono audio data.

In some other embodiments, the fourth audio data is stereo audio data, and the primary earbud and the secondary earbud separately play left channel of audio data and right channel of audio data.

In some other embodiments, the primary earbud may send the left/right channel audio data in the fourth audio data to the secondary earbud, and the primary earbud and the secondary earbud separately play the left channel audio data and the right channel audio data.

Step 710 may be replaced with the following step.

710A: The primary earbud sends the first audio data to the mobile phone.

The foregoing mainly describes the architecture of the Bluetooth connections corresponding to Case 1 shown in FIG. 5A. In the architecture of the Bluetooth connections corresponding to Case 2 shown in FIG. 5B, the Bluetooth connection is also established between the charging case and the mobile phone. The charging case does not need to forward the first audio data to the mobile phone by using the TWS headset, but may directly send the first audio data to the mobile phone through the Bluetooth connection.

Figure 14A:
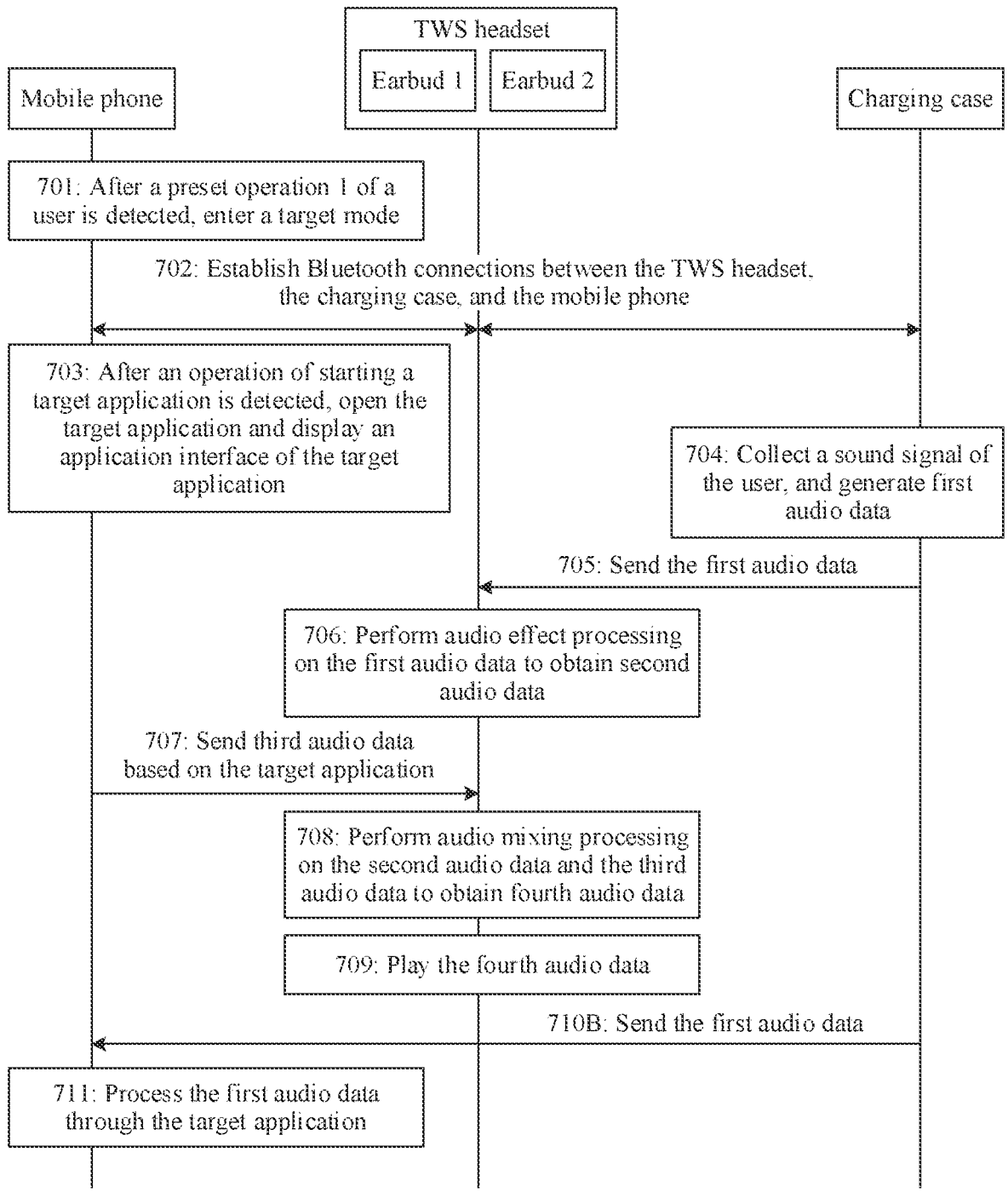
FIG. 14A is a flowchart of yet another audio processing method according to an embodiment of this application.

For example, for the dual-feed connection solution, refer to FIG. 14A. Step 710 may be replaced with the following step.

710B: The charging case sends the first audio data to the mobile phone.

Figure 14B:
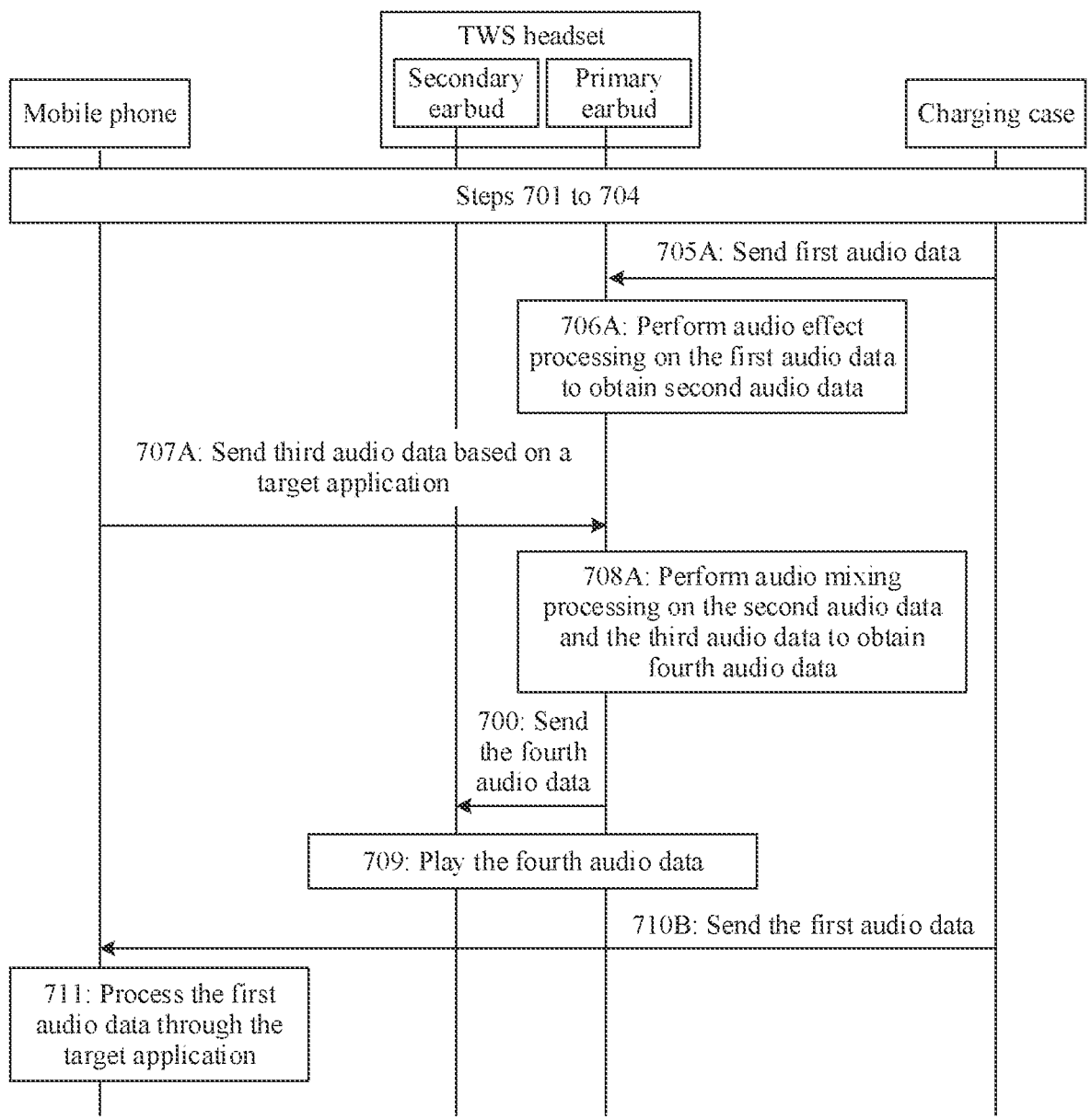
FIG. 14B is a flowchart of still yet another audio processing method according to an embodiment of this application.

For the forwarding connection solution, refer to FIG. 14B. Step 710A may be replaced with the following step.

710B: The charging case sends the first audio data to the mobile phone.

Figure 15:
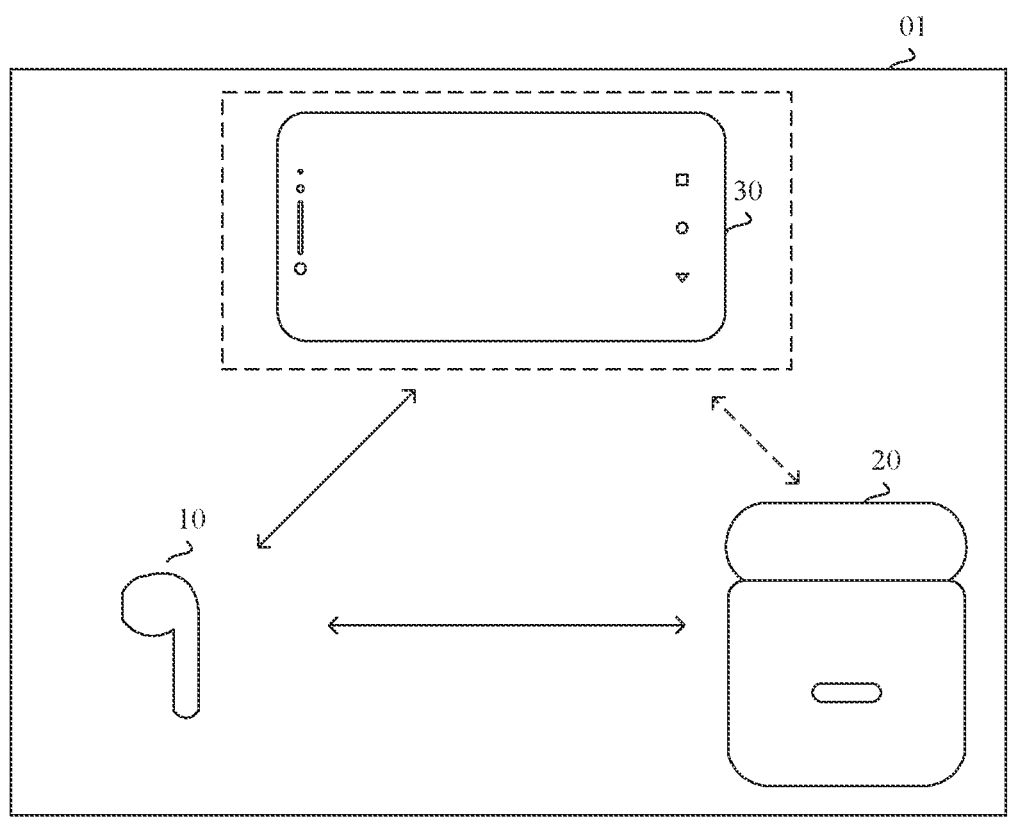
FIG. 15 is a schematic diagram of an architecture of another audio processing system according to an embodiment of this application.

It should be noted that, in embodiments of this application, the user may use the two earbuds of the TWS headset at the same time, or use only one earbud of the TWS headset. The foregoing is described by using an example in which the charging case is used together with a pair of earbuds of the TWS headset. Refer to FIG. 15. The audio processing system may alternatively include only one earbud, and the charging case is used together with one earbud of the TWS headset.

For example, a user 1 uses an earbud 1, a charging case 1, and a mobile phone 1. The charging case 1 picks up sound to obtain first audio data. The earbud 1 performs audio processing on the first audio data to obtain second audio data, where audio data played by the earbud 1 to the user includes fourth audio data obtained by mixing the second audio data with third audio data sent by the mobile phone 1.

For another example, a user 2 uses an earbud 2, a charging case 2, and a mobile phone 2. The charging case 2 picks up sound to obtain first audio data. The earbud 2 performs audio processing on the first audio data to obtain second audio data, where audio data played by the earbud 2 to the user includes fourth audio data obtained by mixing the second audio data with third audio data sent by the mobile phone 2.

The user 1 and the user 2 may use a same mobile phone or different mobile phones, and the user 1 and the user 2 may use a same target application or different target applications on a same mobile phone. For example, the user 1 and the user 2 may use different mobile phones for karaoke. For another example, the user 1 and the user 2 sing a same song by using a same karaoke application on a same mobile phone, and the user 1 and the user 2 may separately hear their own voices through listenback, but cannot hear the voice of the other user through listenback.

Figure 16:
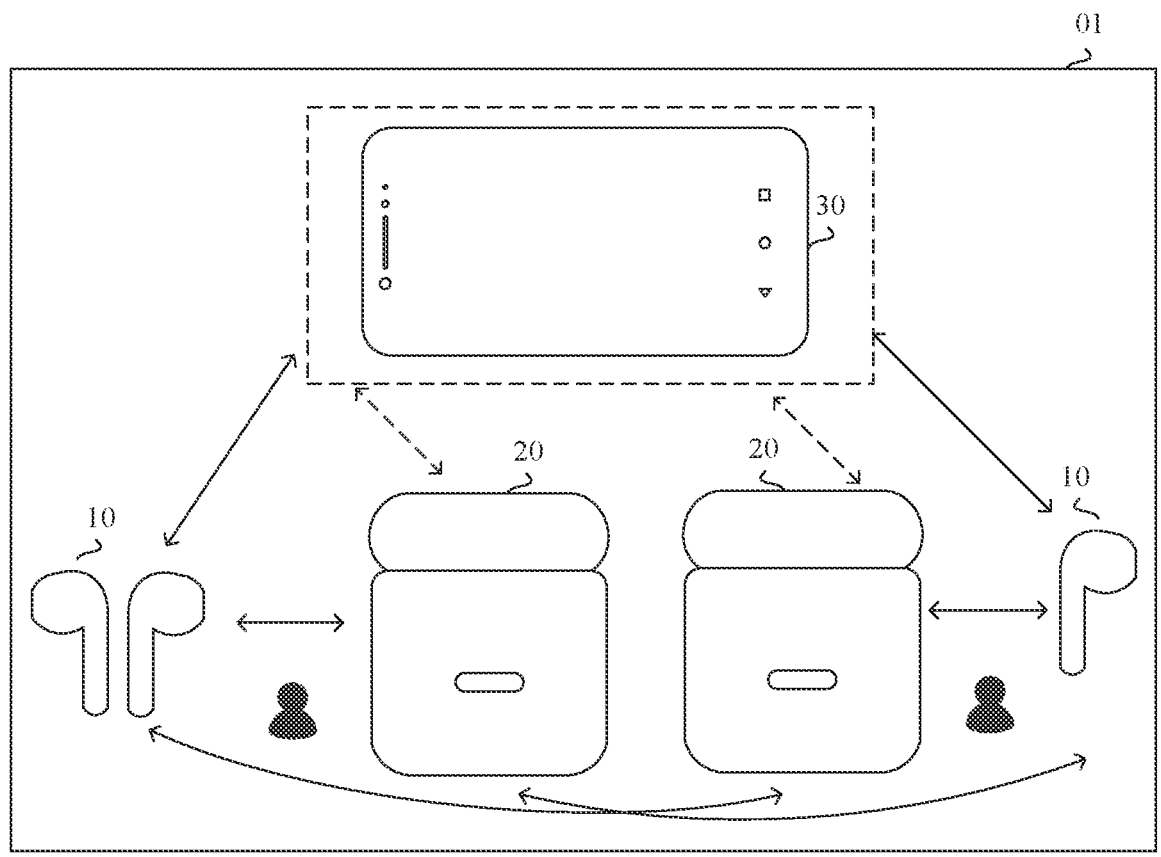
FIG. 16 is a schematic diagram of an architecture of still another audio processing system according to an embodiment of this application.

Refer to FIG. 16. In some other embodiments, the audio processing system may alternatively include a plurality of charging cases and a plurality of earbuds. Each user may conveniently hold one charging case for sound pickup. Each user may use a pair of earbuds or one earbud. Bluetooth connection is established between an earbud and a charging case that are used by a same user, and a Bluetooth connection is also established between earbuds used by different users and charging cases used by another user. Each charging case in the system may perform the operations of the charging case in the foregoing embodiments, and send the obtained first audio data to an earbud of each user. The earbud may perform audio effect processing on first audio data obtained by each charging case, to obtain second audio data, mix the second audio data with third audio data sent by the mobile phone, to obtain fourth audio data, and play the fourth audio data to the user.

For example, a user 1 uses an earbud 1, a charging case 1, and a mobile phone 1, and a user 2 uses an earbud 2, a charging case 2, and the mobile phone 1. The user 1 and the user 2 use a same target application on a same mobile phone. The charging case 1 and the charging case 2 separately obtain respective first audio data, and send the first audio data to the earbud 1 and the earbud 2. The earbud 1 obtains the second audio data after performing audio effect processing on the first audio data from the charging case 1 and the charging case 2, and obtains the fourth audio data after mixing the second audio data with the third audio data sent by the mobile phone 1. The earbud 1 plays the fourth audio data to the user 1. The earbud 2 obtains the second audio data after performing audio effect processing on the first audio data from the charging case 1 and the charging case 2, and obtains the fourth audio data after mixing the second audio data with the third audio data sent by the mobile phone 1. The earbud 2 plays the fourth audio data to the user 2.

For example, in a karaoke scenario, the user 1 and the user 2 use a same karaoke application on a same mobile phone to sing a same song. The user 1 may hear his/her own voice and a voice of the user 2 through listenback, and the user 2 may also hear his/her own voice and the voice of the user 1 through listenback.

The following describes the audio processing method provided in embodiments of this application by using an example in which the audio processing system includes a TWS headset having the structure shown in FIG. 2 and a charging case having the structure shown in FIG. 3, and a wireless communication technology used for audio data transmission is Bluetooth.

Figure 17:
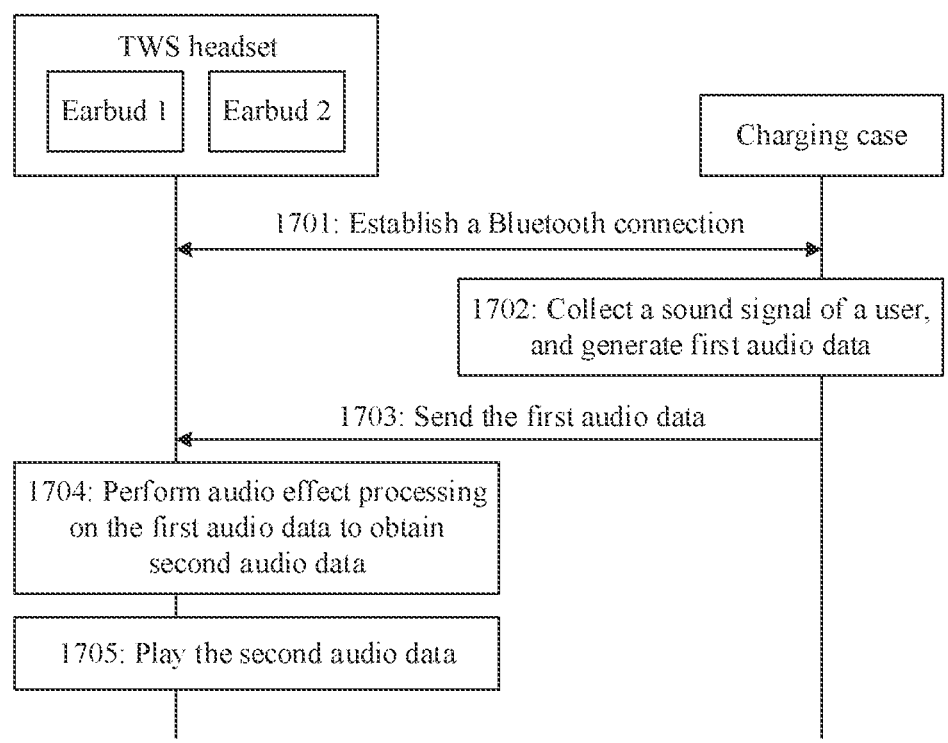
FIG. 17 is a flowchart of a further audio processing method according to an embodiment of this application.

Refer to FIG. 17. In some embodiments, the audio processing method may include the following steps.

1701: Establish a Bluetooth connection between the TWS headset and the charging case.

In some embodiments, after detecting a preset operation 2 of a user, the TWS headset establishes the Bluetooth connection to the charging case. Alternatively, after detecting a preset operation 3 of a user, the charging case establishes the Bluetooth connection to the TWS headset.

In some other embodiments, after the TWS headset is taken out from the charging case, the Bluetooth connection may be automatically established between the TWS headset and the charging case. For example, the TWS headset prestores a Bluetooth address of the charging case, and the charging case also prestores the Bluetooth address of the TWS headset. After the TWS headset is taken out from the charging case, the Bluetooth connection may be established between the TWS headset and the charging case based on the stored Bluetooth address of the peer device.

In some other embodiments, the Bluetooth connection may be established between the TWS headset and the charging case by using another device. For example, the TWS headset may establish a Bluetooth connection to a mobile phone, and the charging case may establish a Bluetooth connection to the mobile phone. The mobile phone may send the Bluetooth address of the TWS headset to the charging case, and send the Bluetooth address of the charging case to the TWS headset. Therefore, the Bluetooth connection may be established between the TWS headset and the charging case based on the Bluetooth address of the peer device obtained from the mobile phone.

The TWS headset includes two earbuds, and a Bluetooth connection solution between the TWS headset and the charging case may include a dual-feed connection solution or a forwarding connection solution.

1702: The charging case collects a sound signal of the user, and generates first audio data.

The charging case may collect a nearby sound signal by using a microphone of the charging case. The user can hold the charging case and place it near the mouth. In this way, the charging case may collect the sound signal of the user, for example, a voice of a speech made by the user, a voice of a speech made by a moderator, or a singing voice of the user. The charging case may generate the first audio data based on the collected sound signal of the user.

1703: The charging case sends the first audio data to the TWS headset.

The charging case sends the first audio data to the TWS headset. In the dual-feed connection solution, the charging case may send the first audio data to the two earbuds of the TWS headset. In the forwarding connection solution, the charging case may send the first audio data to a primary earbud of the TWS headset.

1704: The TWS headset performs audio effect processing on the first audio data to generate second audio data.

In the dual-feed connection solution, after receiving the first audio data, the two earbuds of the TWS headset separately perform audio effect processing on the first audio data to generate the second audio data.

In the forwarding connection solution, after receiving the first audio data, the primary earbud performs audio effect processing on the first audio data to generate the second audio data, and sends the second audio data to a secondary ear bud.

1705: The TWS headset plays the second audio data.

After obtaining the second audio data, the two earbuds of the TWS headset play the second audio data to the user. Because the second audio data is data obtained by performing audio effect processing on the first audio data, and the first audio data is obtained based on the sound signal of the user, after the TWS headset plays the second audio data to the user, the user hears his/her own voice. In this way, listenback of the voice of the user can be implemented. That is, by using this solution, the user can hear his/her voice in real time through listenback.

In this solution, the charging case may collect the sound signal of the user, generate audio data, and send the audio data to the TWS headset. The TWS headset performs audio processing on the audio data and then plays processed audio data to the user, so that the user can hear his/her own voice in real time. In this way, a microphone configured to pick up the sound signal of the user is a microphone of the charging case, and an earpiece configured for listenback of the sound signal of the user is an earpiece of the TWS headset. That is, the microphone configured to pick up the sound signal of the user may be separated from the earpiece for listenback of the sound signal of the user. The user may hold the charging case and place the charging case close to the mouth of the user. The charging case may pick up details of a voice of the user, a signal-to-noise ratio of the picked-up voice of the user is high, and sound pickup quality and a sound pickup effect of the charging case are good. In addition, the earpiece of the TWS headset is also very close to an ear of the user, and an audio playing effect is good. Therefore, a listenback effect is good.

In some embodiments, an audio codec, for example, a high-definition Bluetooth codec, may be disposed on each of the charging case and the TWS headset. Audio data exchanged between the charging case and the TWS headset may be data encoded by the audio codec. Sound information with a high bandwidth can be obtained by using the audio codec, and audio data can be transmitted in real time and quickly through Bluetooth.

In some other embodiments, step 1704 may be omitted. In other words, the TWS headset may not perform audio effect processing on the first audio data to generate the second audio data. In step 1705, the TWS headset may directly play the first audio data.

The foregoing is described by using an example in which the audio processing system includes the two earbuds of the TWS headset. In some other embodiments, the audio processing system may include an earbud of the TWS headset, for example, an earbud 1. In step 1701, the earbud 1 establishes the Bluetooth connection to the charging case. In step 1703, the charging case sends the first audio data to the earbud 1. In step 1704, the earbud 1 performs audio effect processing on the first audio data to generate the second audio data. In step 1705, the earbud 1 plays the second audio data.

It should be noted that, in the audio processing method described in the foregoing embodiments, the audio processing system includes the TWS headset. In some other embodiments, the TWS headset in the audio processing system may alternatively be replaced with another wireless headset, for example, replaced with a wireless headset that includes two earbuds and that has a connection cable between the two earbuds, for example, a neckband wireless headset. When the TWS headset is replaced with another headset, the audio processing method described in the foregoing embodiments may still be used for listenback. Details are not described herein again.

The foregoing is described by using the example in which the wireless communication technology used for audio data transmission is Bluetooth. The wireless communication technology used for audio data transmission may alternatively be another wireless technology, for example, infrared. This is not limited in embodiments of this application.

The foregoing, is described by using an example in which the electronic device is a mobile phone. When the electronic device is another device, for example, a television, a vehicle-mounted device, a computer, a speaker, or a smartwatch, audio processing may also be performed by using the method provided in embodiments of this application. Details are not described herein again.

It may be understood that, to implement the foregoing functions, the electronic device includes corresponding hardware and/or a software module for performing each function. Algorithm steps in the examples described with reference to embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this application.

In embodiments, the electronic device may be divided into functional modules based on the foregoing method examples. For example, each functional module corresponding to each function may be obtained through division, or two or more functions may be integrated into one processing module. The integrated module may be implemented in a form of hardware. It should be noted that, in embodiments, division into the modules is an example and is merely logical function division, and may be other division in an actual implementation.

An embodiment of this application further provides an audio processing apparatus, including one or more processors and one or more memories. The one or more memories are coupled to the one or more processors. The one or more memories are configured to store computer program code, and the computer program code includes computer instructions. When the one or more processors execute the computer instructions, the audio processing apparatus is enabled to perform the foregoing related method steps, to implement the audio processing method in the foregoing embodiments. The audio processing apparatus may be the TWS headset, the charging case, or the electronic device in the foregoing method embodiments.

An embodiment of this application further provides a computer-readable storage medium. The computer-readable storage medium stores computer instructions. When the computer instructions are run on an audio processing apparatus, the audio processing apparatus is enabled to perform the foregoing related method steps, to implement the audio processing method in the foregoing embodiments. The audio processing apparatus may be the TWS headset, the charging case, or the electronic device in the foregoing method embodiments.

An embodiment of this application further provides a computer program product. When the computer program product runs on a computer, the computer is enabled to perform the foregoing related steps, to implement the audio processing method performed by the audio processing apparatus in the foregoing embodiments. The audio processing apparatus may be the TWS headset, the charging case, or the electronic device in the foregoing method embodiments.

In addition, an embodiment of this application further provides an audio processing apparatus. The audio processing apparatus may be specifically a chip, a component, a module, or a chip system. The audio processing apparatus may include a processor and a memory that are connected. The memory is configured to store computer-executable instructions. When the audio processing apparatus runs, the processor may execute the computer-executable instructions stored in the memory, so that the audio processing apparatus performs the audio processing method in the foregoing method embodiments. The audio processing apparatus may be applied to the TWS headset, the charging case, or the electronic device in the foregoing method embodiments.

The audio processing apparatus, the computer-readable storage medium, the computer program product, the chip, and the like provided in embodiments are all configured to perform the corresponding methods provided above. Therefore, for beneficial effects that can be achieved by the audio processing apparatus, the computer-readable storage medium, the computer program product, or the chip, refer to the beneficial effects in the corresponding methods provided above. Details are not described herein again.

Another embodiment of this application provides an audio processing system. Refer to FIG. 1. The audio processing system may include the foregoing TWS headset and charging case. Each device in the audio processing system may be configured to implement the audio processing method in the foregoing embodiments.

Another embodiment of this application provides an audio processing system. Refer to FIG. 1. The audio processing system may include the foregoing TWS headset, charging case, and electronic device. Each device in the audio processing system may be configured to implement the audio processing method in the foregoing embodiments.

Based on descriptions of the foregoing implementations, a person skilled in the art may understand that, for the purpose of convenient and brief descriptions, division into the foregoing functional modules is merely used as an example for description. In actual application, the foregoing functions can be allocated to different functional modules and implemented based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on an actual requirement to achieve the objectives of the solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the current technology, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, for example, a USB flash drive, a removable hard disk, a read-only memory (read only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art in the technical scope disclosed in this application shall fall within the protection scope of this application. Therefore, the protection scope of this application shall be subject to the protection scope of the claims.

What is claimed is:

1. A method comprising:
    establishing a first wireless connection between a wireless headset and an electronic device and a second wireless connection between the wireless headset and a charging case;
    collecting, by the charging case, a sound signal;
    generating, by the charging case, first audio data;
    sending, by the charging case, the first audio data to the wireless headset;
    performing, by the wireless headset, audio effect processing on the first audio data to obtain second audio data;
    sending, by the electronic device, third audio data to the wireless headset;
    performing, by the wireless headset, audio mixing processing on the second audio data and the third audio data to obtain fourth audio data; and
    playing, by the wireless headset, the fourth audio data.

2. The method of claim 1, further comprising:
further sending, by the charging case, the first audio data to a first earbud of the wireless headset and a second earbud of the wireless headset;
further performing, by the first earbud, the audio effect processing on the first audio data to obtain fifth audio data, wherein the second audio data comprises the fifth audio data;
further performing, by the second earbud, the audio effect processing on the first audio data to obtain sixth audio data, wherein the second audio data comprises the sixth audio data;
further sending, by the electronic device, the third audio data to the first earbud and the second earbud;
further performing, by the first earbud, the audio mixing processing on the fifth audio data and the third audio data to obtain seventh audio data, wherein the fourth audio data comprises the seventh audio data; and
further performing, by the second earbud, the audio mixing processing on the sixth audio data and the third audio data to obtain eighth audio data, wherein the fourth audio data comprises the eighth audio data.

3. The method of claim 1, further comprising:
further sending, by the charging case, the first audio data to a first earbud of the wireless headset;
further performing, by the first earbud, the audio effect processing on the first audio data to obtain the second audio data;
further sending, by the electronic device, the third audio data to the first earbud;
further performing, by the first earbud, the audio mixing processing on the second audio data and the third audio data to obtain the fourth audio data; and
sending, by the first earbud, the fourth audio data to a second earbud of the wireless headset.

4. The method of claim 1, further comprising:
detecting, by the electronic device, a first preset operation of a user to start a target application; and
displaying, by the electronic device, an application interface of the target application in response to detecting the first preset operation.

5. The method of claim 4, wherein after sending the first audio data to the wireless headset, the method further comprises:
sending, by the wireless headset, the first audio data to the electronic device; and
performing, by the electronic device, service processing on the first audio data through the target application.

6. The method of claim 4, further comprising:
establishing, by the electronic device, a third wireless connection between the charging case and the electronic device;
sending, by the charging case, the first audio data to the electronic device; and
performing, by the electronic device, service processing on the first audio data through the target application.

7. The method of claim 4, wherein after displaying the application interface, the method further comprises:
prompting, by the electronic device, the user whether to enter a target mode;
detecting, by the electronic device, an operation performed by the user indicating to enter the target mode; and
entering, by the electronic device, the target mode in response to detecting the operation.

8. The method of claim 4, wherein the target application comprises a preset application.

9. The method of claim 1, further comprising:
detecting, by the electronic device, a second preset operation of a user;
displaying, by the electronic device, a setting interface in response to detecting the second preset operation, wherein the setting interface comprises a target mode control;
detecting, by the electronic device, an operation performed by the user on the target mode control; and
entering, by the electronic device, a target mode in response to detecting the operation.

10. The method of claim 1, further comprising:
storing, by the wireless headset, a first communication address of the charging case;
storing, by the charging case, a second communication address of the wireless headset; and
either:
    detecting, by the wireless headset or the charging case, a third preset operation of a user and further establishing, by the wireless headset and the charging case, based on the first communication address and the second communication address, and in response to detecting the third preset operation, the second wireless connection; or
    receiving, by the wireless headset or the charging case, connection information from the electronic device and further establishing, by the wireless headset and the charging case, based on the first communication address and the second communication address, and in response to receiving the connection information, the second wireless connection.

11. The method of claim 1, further comprising:
further establishing, by the electronic device, the first wireless connection to the wireless headset;
further establishing, by the electronic device, a third wireless connection to the charging case;
sending, by the electronic device, a first communication address of the wireless headset to the charging case;
sending, by the electronic device, a second communication address of the charging case to the wireless headset; and
establishing, by the charging case and the wireless headset and based on the first communication address and the second communication address, the second wireless connection.

12. The method of claim 1, wherein each of the first wireless connection and the second wireless connection is a BLUETOOTH connection, and wherein the method further comprises encoding, by the charging case, audio data using a BLUETOOTH audio codec.

13. An audio processing system comprising:
an electronic device;
a wireless headset configured to establish a first wireless connection with the electronic device; and
a charging case configured to:
    establish a second wireless connection with the wireless headset;
    collect a sound signal;
    generate first audio data; and
    send the first audio data to the wireless headset,
wherein the wireless headset is further configured to perform audio effect processing on the first audio data to obtain second audio data,
wherein the electronic device is further configured to send third audio data to the wireless headset, and wherein the wireless headset is further configured to:
  perform audio mixing processing on the second audio data and the third audio data to obtain fourth audio data; and
  play the fourth audio data.

14. The audio processing system of claim 13, wherein the wireless headset further comprises a first earbud and a second earbud, wherein the charging case is further configured to further send the first audio data to the first earbud and the second earbud, and wherein the first earbud is configured to:
  further perform the audio effect processing on the first audio data to obtain fifth audio data, wherein the second audio data comprises the fifth audio data; and
  further perform the audio mixing processing on the fifth audio data and the third audio data to obtain seventh audio data, wherein the fourth audio data comprises the seventh audio data;
wherein the second earbud is configured to:
  further perform the audio effect processing on the first audio data to obtain sixth audio data, wherein the second audio data comprises the sixth audio data; and
  further perform the audio mixing processing on the sixth audio data and the third audio data to obtain eighth audio data, wherein the fourth audio data comprises the eighth audio data; and
wherein the electronic device is further configured to further send the third audio data to the first earbud and the second earbud.

15. A charging case comprising:
  a microphone configured to collect a sound signal;
  an audio system coupled to the microphone and configured to generate first audio data based on the sound signal; and
  a wireless communication system coupled to the audio system and configured to:
    establish a first wireless connection to a wireless headset; and
    send the first audio data to the wireless headset.

16. The charging case of claim 15, wherein the wireless communication system is further configured to:
  further send the first audio data to a first earbud of the wireless headset and a second earbud of the wireless headset; or
  further send the first audio data to the first earbud.

17. The charging case of claim 15, wherein the wireless communication system is further configured to:
  establish a second wireless connection to an electronic device; and
  send the first audio data to the electronic device.

18. The charging case of claim 15, wherein the wireless communication system is further configured to:
  receive a communication address of the wireless headset from an electronic device; and
  establish the first wireless connection to the wireless headset based on the communication address.

19. The charging case of claim 15, further comprising a storage system configured to store a communication address of the wireless headset, and wherein the wireless communication system is further configured to:
  detect a preset operation of a user or receive connection information from an electronic device; and
  further establish the first wireless connection to the wireless headset based on the communication address.

20. The charging case of claim 15, wherein the first wireless connection comprises a BLUETOOTH connection, wherein the audio system further comprises a BLUETOOTH audio codec system configured to encode or decode audio data.

* * * * *